US007921292B1

(12) United States Patent
Pauker et al.

(10) Patent No.: US 7,921,292 B1
(45) Date of Patent: Apr. 5, 2011

(54) SECURE MESSAGING SYSTEMS

(75) Inventors: Matthew J. Pauker, Menlo Park, CA (US); Terence Spies, Palo Alto, CA (US); Rishi R. Kacker, Menlo Park, CA (US); Guido Appenzeller, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 1269 days.

(21) Appl. No.: 10/406,938

(22) Filed: Apr. 4, 2003

(51) Int. Cl.
*H04L 9/32* (2006.01)
(52) U.S. Cl. .................................................. 713/171
(58) Field of Classification Search .................. 703/168, 703/182; 380/258, 178, 286, 44, 30
See application file for complete search history.

(56) References Cited

U.S. PATENT DOCUMENTS

| | | | |
|---|---|---|---|
| 5,016,276 A | 5/1991 | Matumoto et al. | |
| 5,159,632 A | 10/1992 | Crandall | |
| 5,271,061 A | 12/1993 | Crandall | |
| 5,272,755 A | 12/1993 | Miyaji et al. | |
| 5,418,908 A * | 5/1995 | Keller et al. .................. | 709/206 |
| 5,581,616 A | 12/1996 | Crandall | |
| 5,790,790 A * | 8/1998 | Smith et al. .................... | 709/206 |
| 5,920,630 A * | 7/1999 | Wertheimer et al. .......... | 380/286 |
| 6,061,448 A * | 5/2000 | Smith et al. .................... | 380/282 |
| 6,192,407 B1 | 2/2001 | Smith et al. | |
| 6,377,688 B1 * | 4/2002 | Numao ............................ | 380/30 |
| 6,442,600 B1 * | 8/2002 | Anderson ...................... | 709/217 |
| 6,487,599 B1 | 11/2002 | Smith et al. | |
| 6,560,705 B1 * | 5/2003 | Perlman et al. ................ | 713/154 |
| 6,651,087 B1 * | 11/2003 | Dennis ........................... | 709/206 |
| 6,687,741 B1 * | 2/2004 | Ramaley et al. ............... | 709/206 |
| 6,707,890 B1 * | 3/2004 | Gao et al. ..................... | 379/88.12 |
| 6,741,705 B1 * | 5/2004 | Nelson et al. ................. | 380/257 |
| 6,760,752 B1 * | 7/2004 | Liu et al. ....................... | 709/206 |
| 6,839,741 B1 * | 1/2005 | Tsai ............................... | 709/217 |
| 6,993,574 B2 * | 1/2006 | Hall ............................... | 709/219 |
| 7,020,688 B2 * | 3/2006 | Sykes, Jr. ...................... | 709/206 |
| 7,058,971 B1 * | 6/2006 | Horikiri ............................ | 726/7 |
| 7,113,594 B2 * | 9/2006 | Boneh et al. .................... | 380/28 |
| 7,149,893 B1 * | 12/2006 | Leonard et al. ............... | 713/154 |
| 7,266,847 B2 * | 9/2007 | Pauker et al. ................... | 726/27 |

(Continued)

FOREIGN PATENT DOCUMENTS

| | | |
|---|---|---|
| WO | WO 02/51066 A1 | 6/2002 |
| WO | WO 03/001326 A2 | 1/2003 |

OTHER PUBLICATIONS

Henk van Tilborg, Encyclopedia of Cryptography and Security, 2005, Springer Science+Business Media Inc., 273-281.*

(Continued)

*Primary Examiner* — Nasser Moazzami
*Assistant Examiner* — Daniel L Hoang
(74) *Attorney, Agent, or Firm* — Treyz Law Group; G. Victor Treyz; Nancy Y. Ru

(57) ABSTRACT

A system is provided that uses cryptographic techniques to support secure messaging between senders and recipients. A sender may encrypt a message for a recipient using the recipient's public key. The sender may send the encrypted message to the message address of a given recipient. A server may be used to decrypt the encrypted message for the recipient, so that the recipient need not install a decryption engine on the recipient's equipment.

22 Claims, 15 Drawing Sheets

U.S. PATENT DOCUMENTS

| | | | |
|---|---|---|---|
| 2002/0004899 A1* | 1/2002 | Azuma | 713/152 |
| 2002/0016910 A1* | 2/2002 | Wright et al. | 713/150 |
| 2002/0038421 A1* | 3/2002 | Hamada | 713/171 |
| 2002/0076042 A1 | 6/2002 | Sandhu et al. | |
| 2002/0076055 A1* | 6/2002 | Filipi-Martin et al. | 380/282 |
| 2002/0124167 A1* | 9/2002 | Toyota et al. | 713/150 |
| 2003/0076954 A1* | 4/2003 | Vanstone et al. | 380/28 |
| 2003/0142364 A1* | 7/2003 | Goldstone | 358/402 |
| 2004/0025019 A1* | 2/2004 | Watanabe et al. | 713/168 |
| 2004/0179684 A1* | 9/2004 | Appenzeller et al. | 380/44 |
| 2005/0071632 A1* | 3/2005 | Pauker et al. | 713/165 |
| 2005/0138353 A1* | 6/2005 | Spies et al. | 713/153 |

OTHER PUBLICATIONS

Henk van Tilborg, Encyclopedia of Cryptography and Security, 2005, Springer Science + Business Media Inc., 273-281.*

Jeremy Horwits and Ben Lynn, "Toward Hierarchical Identity-Based Encryption," Advances in Cryptology: EUROCRYPT 2002, Lecture Notes in Computer Science, vol. 2332, pp. 466-481, 2002.

Xuejia and James L. Massey, "A Proposal for a New Black Encryption Standard," Advances in Cryptology—EUROCRYPT '90, pp. 389-404, Proceedings, LNCS 473, Springer-Verlag, 1991.

* cited by examiner

SECURE MESSAGING SYSTEMS

BACKGROUND OF THE INVENTION

This invention relates to messaging systems such as email messaging systems, and more particularly, to ways in which to send secure messages.

Cryptographic systems are used to provide secure communications services such as secure email services and secure web browsing.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given receiver from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems based on this type of fairly traditional approach are referred to herein as PKE cryptographic systems.

Identity-based-encryption (IBE) arrangements have also been proposed. With IBE encryption systems, a message recipient's email address or other identity-based information may be used as the recipient's public key. With IBE encryption schemes, it is generally not necessary to look up a given recipient's public key as with PKE systems such as the RSA system. Rather, a sender may create the public key based on well-known rules. For example, a sender may create the public key by simply determining the recipient's email address.

Public parameter information and private keys are used to support IBE encryption and decryption operations. Each user has a unique private key based on the user's identity for decrypting messages, but the public parameter information that is used during the encryption and decryption processes may be shared by many users. These schemes are said to be "identity based," because user-specific identity information such as a particular intended recipient's email address is used as one of the inputs to the IBE encryption algorithm. With one suitable arrangement, a user's email address or a user's email address concatenated with a date stamp may be used to identify each user.

When a recipient receives a PKE-encrypted or IBE-encrypted message, the recipient must generally use an appropriate decryption algorithm to decrypt the encrypted message and access its contents. If the recipient does not have the appropriate decryption software installed on their equipment, the recipient may download a plug-in module or otherwise obtain the necessary software for performing the decryption process. This can be difficult for the recipient to do, particularly if the recipient wishes to receive encrypted messages in an organization that places restrictions on user-installed software.

SUMMARY OF THE INVENTION

In accordance with the present invention, a system is provided that provides secure messaging capabilities. Senders can send secure messages to recipients. PKE and IBE encryption techniques may be used to encrypt the messages. A server such as a third-party server on the Internet or a LAN server can be used to decrypt messages for recipients. Recipients generally need not install and run decryption software on their equipment in order to receive access to the content of the messages.

With one suitable approach, encrypted mail is sent to a recipient's email address. A server at the recipient's organization may receive the encrypted mail and may store it in an encrypted mail database. The server may send the recipient a notification message that informs the recipient that a message is awaiting the recipient. The message may include an interactive prompt such as a URL (universal resource locator) or other link that the recipient can click on to begin accessing the message. When the recipient responds to the notification message from the server, the server may ask the recipient to provide suitable credentials that the server can use to verify the identity of the recipient. After verifying that the recipient is authorized to access the message, the server can use the recipient's credentials to obtain a copy of the recipient's private key. The server can then retrieve the stored version of the encrypted message from the encrypted mail database and can decrypt the message using the recipient's private key and the appropriate decryption algorithm. The server can provide the recipient with access to the decrypted message over a secure link.

With another suitable approach, the encrypted message from the sender may include forwarding notification information in the form of instructions for the recipient that direct the recipient to forward the encrypted message to a suitable decryption server for decryption. For example, the sender's messaging program may incorporate forwarding notification information into the message in the form of text stating "to view, forward this message to decrypt@xyz.com." When the server receives the forwarded encrypted message from the recipient, the server may respond by sending an interactive message to the recipient. The interactive message may include an interactive message access prompt such as a URL or other link that the recipient can click on to begin accessing the decrypted contents of the message. After the recipient responds to the interactive message, the server may verify the recipient's authorization to access the contents of the encrypted message. If the recipient is authorized, the server may obtain a copy of the recipient's private key and may use the key and a suitable decryption algorithm to decrypt the encrypted message. The server may provide the recipient with access to the decrypted version of the message over a secure communications link.

If desired, other equipment (e.g., the sender's equipment or a downstream server) may add an interactive message access prompt (e.g., a URL or other clickable link) that the recipient can respond to in order to initiate message retrieval. With this type of approach, the forwarding notification information (e.g., "to view, forward this message to decrypt@xyzcorp.com") may (in unencrypted form) be incorporated into the encrypted message by the sender. The interactive message access prompt (e.g., an unencrypted prompt stating "after forwarding message, click here to access: https://decrypt.intranet.xyzcorp.com") may be added to the encrypted message by the sender or by a downstream server. For example, the sender's equipment, a server at the recipient's location, or an intermediate server may add the interactive message access prompt to the original message. When the recipient receives the encrypted message, the recipient may forward the message to the appropriate server for decryption in response to the forwarding notification information. Because both the forwarding notification information and the interactive message access prompt appear in the same message (along with the encrypted payload), it is not necessary for the server to send a separate interactive message to the recipient. After the recipient responds to the interactive message access prompt (e.g., by clicking on the link), the server can verify that the recipient is authorized to access the content of the encrypted message and can obtain a copy of the recipient's private key. The server may use the private key and the appropriate decryption algorithm to decrypt the encrypted message. The server may then provide the recipient with access to the content of the decrypted message over a secure communications link.

If desired, the recipient may install software that automatically forwards certain encrypted messages to the server for decryption. The auto-forwarding software may, for example, forward to the server all messages that contain a particular code (e.g., a text or numeric code indicating that decryption by a particular server is required and specifying the address of that server).

The software running on the sender's equipment may, if desired, automatically send a copy of an encrypted message to a server when the original encrypted message is sent to the recipient. The server may retain the copy of the encrypted message until contacted by the recipient. Because the server already has a copy of the encrypted message when the system is configured in this way, the recipient need not forward a copy of the message to the server and the message need not contain forwarding notification information or information for supporting automatic forwarding by the recipient. The message may contain an interactive message access prompt such as a clickable URL or other link. When the recipient responds to the prompt, the server may verify that the recipient is authorized to access the message. If the recipient is authorized, the server may obtain a copy of the recipient's private key. The server may decrypt the message using the recipient's private key and using the appropriate decryption algorithm. The server may then provide the recipient with access to the decrypted contents of the message over a secure link.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
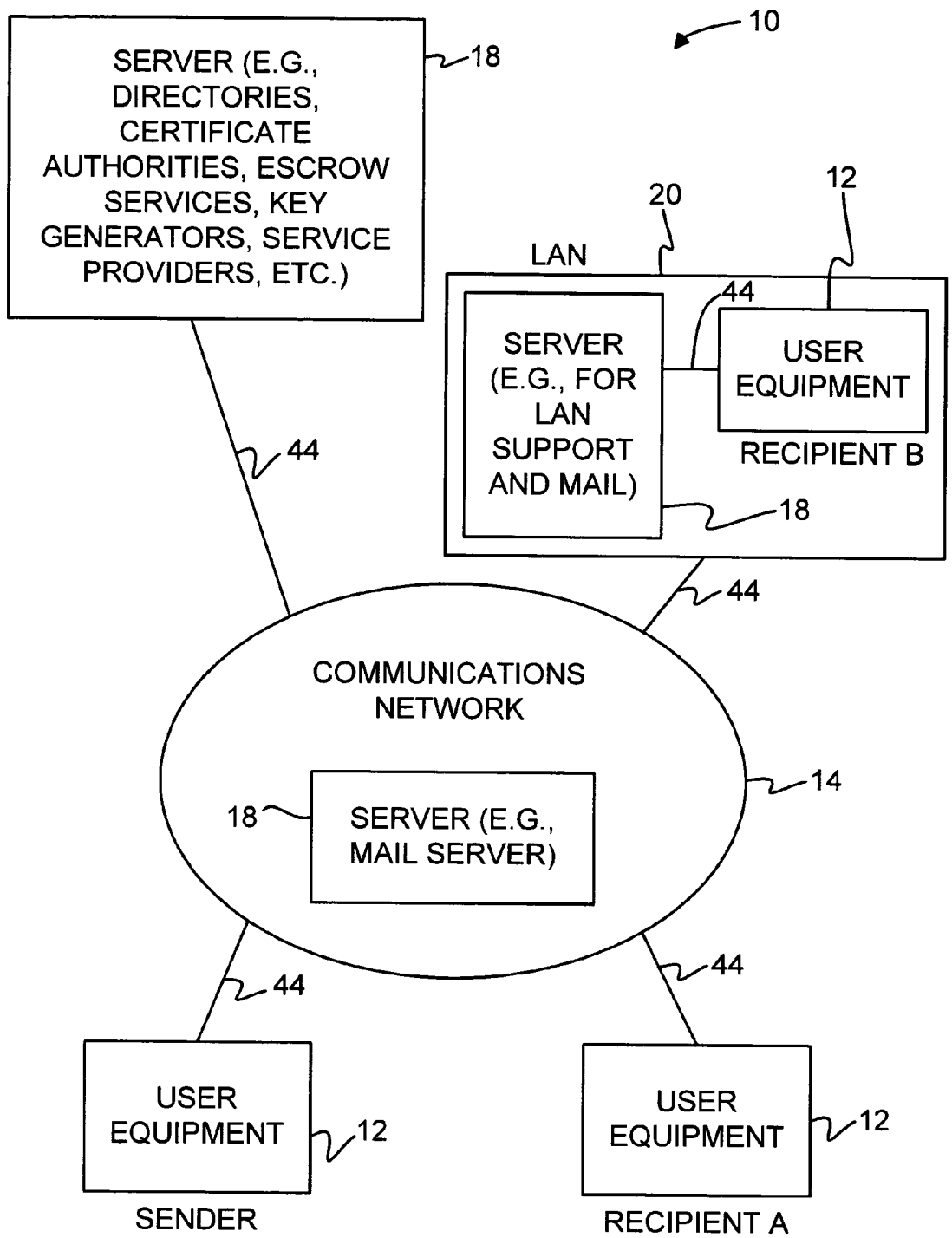
FIG. 1 is a diagram of an illustrative system for supporting secure messaging functions in accordance with the present invention.

An illustrative system 10 that may be used to support secure messaging is shown in FIG. 1. In FIG. 1 and the other FIGS., a user may send a secure message to one or more other users over a communications network 14. The users in the systems described herein may be individuals, organizations, or any other suitable parties or entities. A user who is sending a message is called a sender. Users receiving messages are called recipients. The messages may include any digital information (e.g., text, graphics, audio, video, commands, executable code, data, etc.) that it is desired to convey electronically between senders and recipients in a secure manner.

Users may communicate with each other using user equipment devices 12. Equipment 12 may, for example, include computing equipment such as a personal computers, portable computers, mainframe computers, networked computers or terminals, telecommunications equipment, handheld computers or personal digital assistants, or cellular telephones. Multiple users may use the same device. For example, a group of users may share the use of a single computer terminal that is connected to a host computer in a local area network 16. These are merely illustrative examples of the type of platforms that the users may use. User equipment 12 may be based on any suitable electronic equipment if desired.

The user equipment devices in the arrangement of FIG. 1 and the other FIGS. may be interconnected by communications paths 44 in communications network 14. Network 14 may be, for example, the Internet, a local area network, a wide area network, the public switched telephone network, a virtual private network, a wired network, a wireless network, dedicated leased lines, a network based on fiber-optic or cable paths 44 or other wired or wireless paths 44, or a network formed using any other suitable network technology or a combination of such networks.

Various computing devices may be contained within network 14 and connected to network 14 to support secure messaging features. The location of such computing equipment is generally not critical. For example, computing equipment may be used to implement the functions of one or more servers 18. One or more of such servers 18 may be used to implement a cryptographic key directory service (as an example). The server or servers may be co-located with a sender, may be connected to the network 14 as an independent third party, may be part of what is traditionally considered to be the infrastructure of network 14, may be associated with a given recipient's organization, may be co-located with the recipient, or may used at more than one of these locations. These are merely illustrative arrangements and need not be mutually exclusive.

The computing equipment that is contained within network 14 or connected to network 14 can be used as a server in a client-server architecture. The functions implemented using servers in system 10 may generally be performed using other computer equipment configurations if desired, but the computing equipment for implementing these functions is generally referred to as a "server" or "servers" for clarity. A server may be formed using a single computer or multiple computers. Multiple servers may be implemented on one computer. If desired, the functions of a single server may be provided by computers that are distributed over a number of different physical locations.

A sender may send a message to a given recipient over system 10 using any suitable messaging format. For example, an email message, an instant message, or other electronic messages may be sent. For clarity, the present invention is sometimes described in the context of email messages. This is merely illustrative. Any suitable type of messages may be conveyed between senders and receivers if desired.

During delivery of an encrypted message to a recipient, the encrypted message may pass through a number of mail servers and other computer equipment. Operation of system 10 is often described herein in the context of one server (or a small number of servers) for clarity and without loss of generality, even though messages may be conveyed through multiple mail servers during a typical delivery process. The functions of a given server may generally be implemented using multiple servers (and/or other system components) if desired, but this possibility is not mentioned repeatedly herein to help clarify the discussion.

In system 10, some recipients (e.g., the recipient labeled as recipient A in FIG. 1) may be communicate with a sender without being part of a local area network, whereas other recipients (e.g., the recipient labeled as recipient B in FIG. 1) may be located within a local area network (LAN) 20. In LAN environments, one or more local servers 18 may be used to distribute messages (e.g., email messages) to users, as illustrated by the server 18 in LAN 20 in FIG. 1. Such a local server may, for example, be a server running Microsoft's Exchange email software.

If a recipient is associated with a small organization, the recipient's organization may share a mail server with other organizations (i.e., the recipient's primary mail server may be operated by a third-party). If the recipient is associated with a medium-size organization, the recipient's organization may have an in-house mail server for distributing electronic messages to users at a single location. Large organizations may have numerous mail servers some of which may be operated at locations that are remote from the recipient's physical location and one or more of which may be co-located with the recipient. Mail server functions may be implemented on the same equipment that is used to implement other server functions (e.g., LAN support functions) or may be implemented on separate equipment.

Some user activities in system 10, such as sending person-to-person email messages, involve at least some manual intervention. For example, a person who desires to send a personally-composed text message must type the message before it is encrypted and sent to the appropriate recipient. However, other user activities in system 10 may be entirely automated so that no human intervention is generally required. As one example, the user at one device 12 may be a banking institution that desires to use encrypted communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. Moreover, system functions involved in presenting on-screen options for humans to respond to (e.g., by clicking on them using a computer mouse) are also automated in that they are implemented using software running on the system components of FIG. 1 and the other FIGS. Whether a particular function preferably involves manual intervention or may be implemented by a computer will be clear from context in the following discussion.

During certain operations of system 10, various entities (e.g., a private key generator, a key escrow service, a certificate authority, a mail server, etc.) may need to verify that a given user has permission to access certain content or to perform certain functions. In general, the entity performing the user authentication may use any suitable manual or automatic authentication technique. For example, the user may be asked to fax or mail a letter to the authenticating entity on the user's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. A user may also provide credentials in the form of a pre-established user name and password.

When the authentication process involves electronic communications between the user and the authenticating entity, the communications path between the user and the authenticating entity should be secure. The communications path may be assumed to be secure if it is not available for use by untrusted parties. For example, the network between the user and the authenticating entity's server may be a private line that is controlled by the authenticating entity or another trusted entity. As another example, a secure channel may be supported using a secure web browser link (e.g., using the secure sockets layer protocol).

Often web-based authentication processes will be used for user authentication. An advantage of web-based authentication processes is that the most or all of the process of verifying a user's identity and authorization to access particular content or authorization to perform a particular operation may be performed on line using a web browser. With one suitable web-based approach, a user may be asked to provide information such as a username and password through a series of interactive web pages. Authentication approaches based on the use of hardware tokens and cookies may also be used. These are merely illustrative examples of suitable ways in which entities in system 10 can examine a user's credentials to verify whether users are authorized to access content or perform actions. Any suitable arrangement for authenticating users may be used if desired.

The secure messaging systems of the present invention may use public key encryption cryptographic techniques such as used with RSA public-key cryptography. These traditional public key cryptographic techniques are referred to herein as "PKE" cryptographic techniques. The secure messaging systems of the present invention may also use identity-based encryption (IBE) cryptographic techniques. These cryptographic techniques are referred to herein as "IBE" cryptographic techniques.

PKE and IBE encryption schemes use an asymmetric approach. Some information (so-called public key information) is used to encrypt messages. Other corresponding information (so-called private key information) is used to decrypt the encrypted message.

To enhance the efficiency of the decryption and encryption processes, two-step decryption techniques may be used in which a message key (e.g., a symmetric message key) is used to encrypt the contents of a message prior to transmission to the recipient. The PKE or IBE process is then used to encrypt the symmetric message key. The message that is sent from the sender to the recipient contains the PKE-encrypted or IBE-encrypted message key and the message-key-encrypted message contents. At the recipient, the recipient uses the PKE private key or IBE private key to decrypt the message key. The message key may then be used by the recipient to decrypt the rest of the message. These two-step processes may be more efficient than "pure" or "single step" PKE and IBE encryption algorithms in which the PKE algorithm or IBE algorithm alone is used to encrypt the entire message. In general, either "two-step" encryption schemes or "single-step" schemes may be used. Both types of approaches are referred to herein as simply "PKE" schemes or "IBE" schemes for clarity.

To understand the PKE and IBE secure messaging features used in system 10, the basic principles of PKE and IBE messaging are described in connection with FIGS. 2-5. The principles of PKE-based secure messaging are introduced in connection with FIGS. 2 and 3. The principles of IBE-based secure messaging are introduced in connection with FIGS. 4 and 5. PKE-encrypted messages and IBE-encrypted messages are sent from senders to recipients. In the examples of FIGS. 2-5, the recipients have decryption software that is used to decrypt the encrypted messages. Recipients may not always be able (at least initially) to install decryption software on their equipment. For example, a network administrator may not allow a recipient in an organization to install decryption software on the recipient's equipment. To support secure PKE or IBE messaging in these environments, decryption functions may be implemented on a server that is separate from the recipient, but which the recipient can communicate with over a secure link. These types of server-based decryption arrangements are described in connection with FIGS. 6-14.

Figure 2:
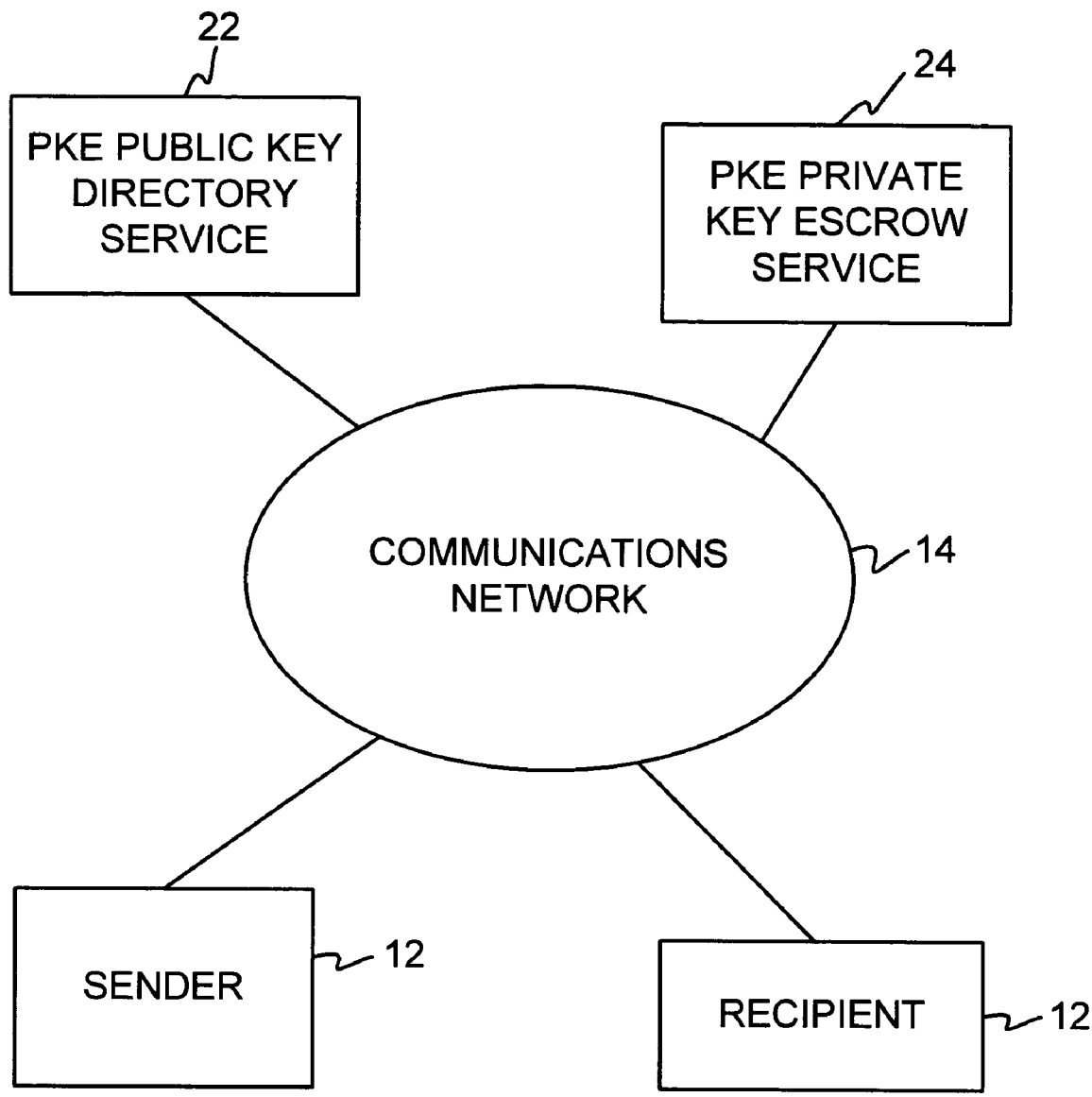
FIG. 2 is a diagram of illustrative cryptographic system components used to implement PKE cryptographic techniques in accordance with the present invention.

System components that may be used to support PKE-based secure messaging are shown in FIG. 2. In FIG. 2 (and the other FIGS.), users at user equipment devices 12 may communicate over communications network 14. A server or other computing equipment at a PKE public key directory service 22 may be used to make the PKE public keys of users available to other users. A PKE private key escrow service 24 may be used to store the private keys of certain users. For example, PKE private key escrow service 24 may be used to store the private keys of those users in an organization who wish to receive encrypted email but who are not authorized by their system administrators to install their own desk-top decryption software.

Figure 3:
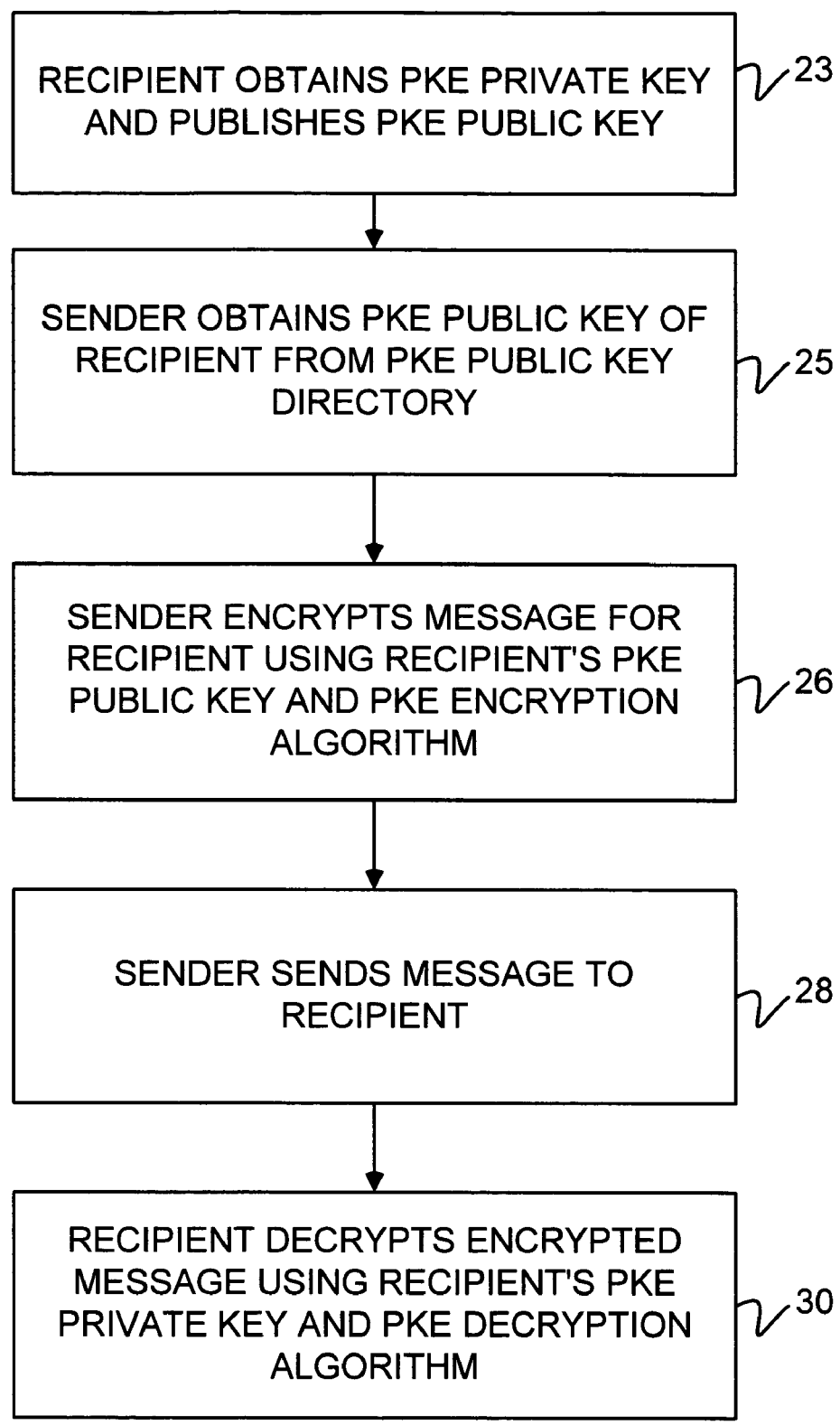
FIG. 3 is a flow chart of steps involved in using the PKE-based system components of FIG. 2 in accordance with the present invention.

Illustrative steps involved in sending a message from a sender to a recipient using the PKE-based arrangement of FIG. 2 are shown in FIG. 3. In PKE-based cryptographic schemes, key generators implemented at user locations or on remote equipment generate public-key/private-key pairs for users. The PKE public keys may be used by senders to encrypt messages prior to transmission to recipients. The recipients may use their unique PKE private keys to decrypt the encrypted messages.

At step 23, a recipient who desires to receive encrypted messages may obtain the PKE public-key/private-key pair from the key generator. The recipient may retain the PKE private key on the recipient's equipment for later use in decrypting PKE-encrypted messages. In some environments, the recipient's system administrator will not allow the recipient to install or run third-party software on the recipient's equipment. In such situations, the recipient may provide the recipient's PKE private key to a private key escrow service such as PKE private key escrow service 24 of FIG. 2. When the recipient's PKE private key is held by a PKE private key escrow service, trusted parties (e.g., a mail server associated with the recipient's organization) may obtain a copy of the recipient's PKE private key from the PKE private key escrow service and may use this copy in decrypting messages for the recipient.

The recipient may publish the recipient's PKE public key on a PKE public key directory service such as PKE public key directory service 22 of FIG. 2. If desired, the recipient can provide the public key directly to interested senders (e.g., on a diskette, over the telephone, by email, by placing the public key on a web site, etc.). Regardless of how the recipient makes the recipient's PKE public key publicly available to other users in the system, a sender must obtain a copy of the PKE public key of the recipient before the sender can encrypt a message for that recipient using PKE encryption.

As shown in FIG. 3, the sender may obtain a copy of the PKE public key of an intended message recipient from the PKE public key directory service 22 electronically over communications network 14 at step 25.

The sender may compose a message for the intended recipient using any suitable technique. For example, the sender may compose a message for the intended recipient by personally typing a text message, by cutting-and-pasting from existing documents, by attaching or otherwise incorporating media files into a message, or by using any other suitable technique to create content and select which content is to be part of the message.

Once the sender has composed a message and has obtained the PKE public key of the intended message recipient, the sender may encrypt the message using the recipient's PKE public key and using the appropriate PKE encryption algorithm at step 26. The resulting encrypted message may only be decrypted using the PKE private key of the intended recipient, so when the sender sends the encrypted message to the recipient over network 14 at step 28, the encrypted message is protected against interception.

At step 30, after the recipient has received the encrypted message, the recipient may use the appropriate PKE decryption algorithm and the recipient's PKE private key to decrypt the encrypted message and thereby access the contents of the message. If allowed by the recipient's system administrator (if any), the decryption algorithm may be implemented on the recipient's equipment 12 for the recipient to use in decrypting the encrypted message. If desired, the decryption algorithm may be implemented on a server that is able to communicate securely with the recipient (e.g., over a secure communications link such as a secure sockets layer or SSL link). With this type of configuration (discussed further in connection with FIGS. 6-13), the server decrypts the encrypted message at step 30. It may be desirable to perform decryption on a server that is separate from the recipient's equipment, particularly in system environments in which the recipient is not permitted to install third-party software on their equipment.

Figure 4:
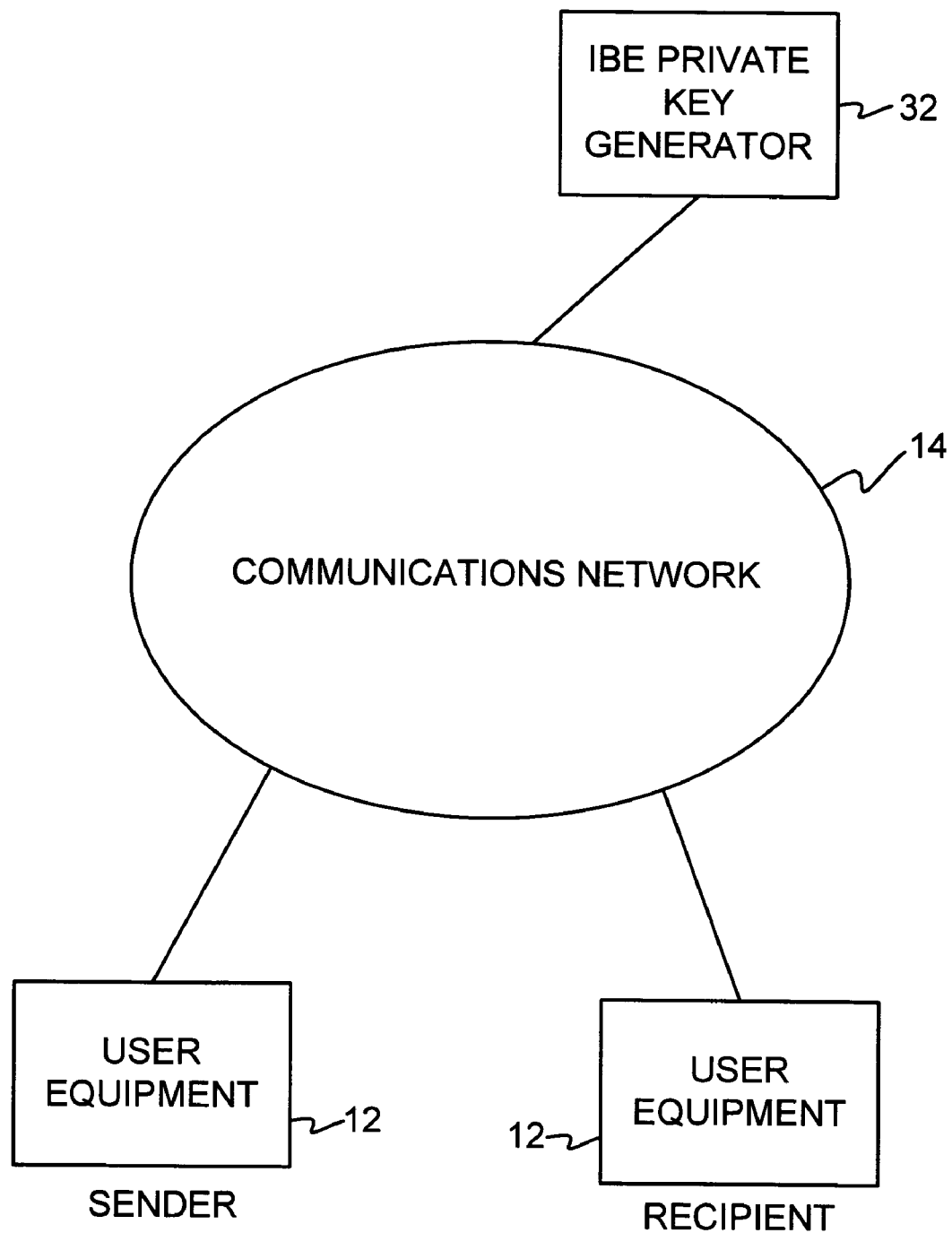
FIG. 4 is a diagram of illustrative cryptographic system components used to implement IBE cryptographic techniques in accordance with the present invention.

System components that may be used to support IBE-based secure messaging are shown in FIG. 4. A server or other computing equipment at an IBE private key generator 32 may be used to generate IBE private keys for users (e.g., message recipients) who wish to decrypt encrypted messages that they have received. The IBE private keys may be provided to the recipients by IBE private key generator 32 electronically (e.g., using a secure communications link over network 14).

If desired, the key generation functions of private key generator 32 may be divided among multiple computers at one or more locations (each of which may have only part of the secret information needed to generate the private keys). For clarity, the present discussion will focus primarily on private key generator arrangements in which a private key generator 32 individually generates its own private keys for its own associated users.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, the IBE private key generator (e.g., IBE private key generator 32 of FIG. 4) obtains or generates a master secret s. For example, the private key generator may create a master secret from a number that is randomly generated at the private key generator by a processor housed inside a tamper-proof enclosure. The master secret may also be produced off-site and delivered to the private key generator 32. The master secret (also sometimes referred to as a secret master key or a master key) is secret information that will subsequently be used by the private key generator 32 to generate private keys for recipients in the system to use in decrypting messages and to generate public parameter information for use by senders in encrypting messages.

After the master secret s has been obtained, the private key generator may generate public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is essentially impossible.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., the public parameters P and sP) has been determined, the IBE private key generator 32 may publish this information. For example, this information may be made available over the communications network 14 using computing equipment (e.g., a server) at private key generator 32. The public parameter information may be sent to users via email. If desired, the public parameter information may be provided to users on demand (e.g., by downloading from a server, in the form of a message, or using other suitable arrangements). Public parameter information (e.g., the public parameters P and sP) may be distributed as part of a downloadable or preinstalled software module or package. For example, the public parameter information may be incorporated into an email application, web browser, or other communications or Internet application that is distributed with personal computers or other user equipment 12 or that is downloaded (e.g., in the form of a plug-in or stand-alone package) at a later time.

If the public parameter information includes more than one parameter, the parameters may be distributed together or separately. For example, parameters P and sP may be distributed together or separately. If parameters P and sP are distributed separately, each parameter may be distributed using a different distribution mechanism. For example, P may be built into user software and sP may be distributed over the Internet. Moreover, P and sP may be combined to form the equivalent of a single number or parameter or may be subdivided (e.g., to form three or more public parameter sub-parts). If desired, public parameter information (e.g., public parameters P and sP) may be distributed manually (e.g., by printed mail or by distributing a diskette or other computer-readable media to the user).

There may be multiple private key generators 32 in system 10. Moreover, private key generators may generate multiple versions of the public parameter information (e.g., based on different P values—$P_{VERSION-1}$, $P_{VERSION-2}$, etc.). The public parameter information for each private key generator and for each version may be distributed using any of the above-mentioned distribution techniques or a combination of such techniques. These distribution methods are merely illustrative. Any suitable technique may be used to publish the public parameter information if desired.

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine on the sender's equipment may be used to encrypt the message. The IBE encryption engine may use the public parameter information (e.g., P and sP) and the IBE public key associated with the recipient to perform message encryption. When the recipient receives the IBE-encrypted message, or earlier, when the recipient sets up or updates the equipment at the recipient's location, the recipient obtains the recipient's IBE private key from the IBE private key generator to use in decrypting the message.

Identity-based encryption (IBE) is so named because the encryption process at the sender uses an IBE public key Q based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional public-key cryptographic schemes such as the RSA cryptographic scheme. For example, the IBE public keys may be the same as (or based on) user email addresses, which are readily obtainable.

The IBE private key generator 32 may generate IBE private keys for each of the multiple users associated with that IBE private key generator based on the IBE public keys (the Q's) of each of these users (i.e., based on the users' identities).

The form of IBE public key Q that is used for a given IBE system depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information.

As another example, users' privileges may be restricted based on security clearance level, by concatenating or otherwise adding security clearance level information to each user's email address when forming the public keys Q (i.e., Q=joe@navy.com|top_secret, etc.). These approaches are merely illustrative of the ways in which additional criteria may be added to a user identity such as a user email address when forming the IBE public key for each user (e.g., the Q for each user). Any suitable approach for forming the IBE public keys may be used if desired.

A sender desiring to send an IBE-encrypted message to a given recipient generally must know the recipient's identity (e.g., the recipient's email address) and, if applicable, must know how to construct the user's IBE public key Q from the additional public key information (e.g., validity period, security level, etc.) The sender must also obtain the public parameter information (e.g., P and sP). Prior to message transmission, the sender may use the IBE encryption process (e.g., the process of the work of Boneh and Franklin described above) to encrypt the message contents for the recipient. The IBE process may be implemented using software at the sender's equipment (e.g., an IBE encryption engine). The IBE encryption engine may take as inputs (1) the message to be encrypted, (2) IBE public parameter information (e.g., P and sP), and (3) the IBE public key Q that is based on the identity of the given recipient to which the message is to be sent. The IBE process implemented using the IBE encryption engine produces an encrypted version of the message as its output.

After the sender transmits the IBE-encrypted message to the recipient over communications network 14, the recipient may receive and decrypt the received message using an appropriate IBE private key. The IBE private key that is used for decrypting the message is related to the identity-based-encryption public key Q and public parameter information (e.g., P and sP) used when encrypting the message. Only the IBE private key that matches the IBE public key used to encrypt the message may be used to decrypt the message. Generation of the IBE private key requires knowledge of the master secret s, so only the private key generator 32 can generate the recipient's IBE private key based on the recipient's IBE public key Q.

With one suitable approach, the IBE private key for the recipient may be generated from the recipient's identity Q and the master secret s by using an appropriate mathematical function (e.g., the multiplication of integers with points on elliptic curves) to calculate the value of sQ. The recipient's identity may be verified using authentication information (credentials) from the recipient before the IBE private key is issued to the recipient. Any suitable manual or automatic authentication technique (e.g., an authentication technique of the type described in connection with FIG. 1) may be used by the IBE private key generator 32 to verify that the recipient is authorized to receive the IBE private key prior to issuing the key to the recipient.

Regardless of how the IBE private key generator 32 authenticates the identity of the recipient and generates the recipient's private key, with the basic IBE approach being described in connection with FIGS. 4 and 5 the private key should be provided to the recipient for use in decrypting the message. Any suitable technique may be used to provide the IBE private key to the recipient. For example, the private key may be transmitted to the recipient in an email or other suitable message, may be made available for downloading over the Internet (as part of a stand-alone downloadable application or a downloadable plug-in module, as a stand-alone key, etc.). A secure communications channel may be used for electronic communications between the IBE private key generator 16 and the recipient's equipment 12. If desired, the IBE private key may be preinstalled on the recipient's equipment, so that the private key will be available for the recipient when the recipient first uses the equipment. The private key may also be distributed by mail or courier (e.g., on a computer-readable medium such as a computer disk or memory chip).

The recipient may, if desired, store the private key locally (e.g., in a database on a storage device such as a memory circuit or hard drive on the recipient's equipment). If the private key is stored locally, the recipient can retrieve it the next time a message needs to be decrypted without needing to contact the IBE private key generator 32 to obtain a new copy of the IBE private key over the communications network.

Figure 5:
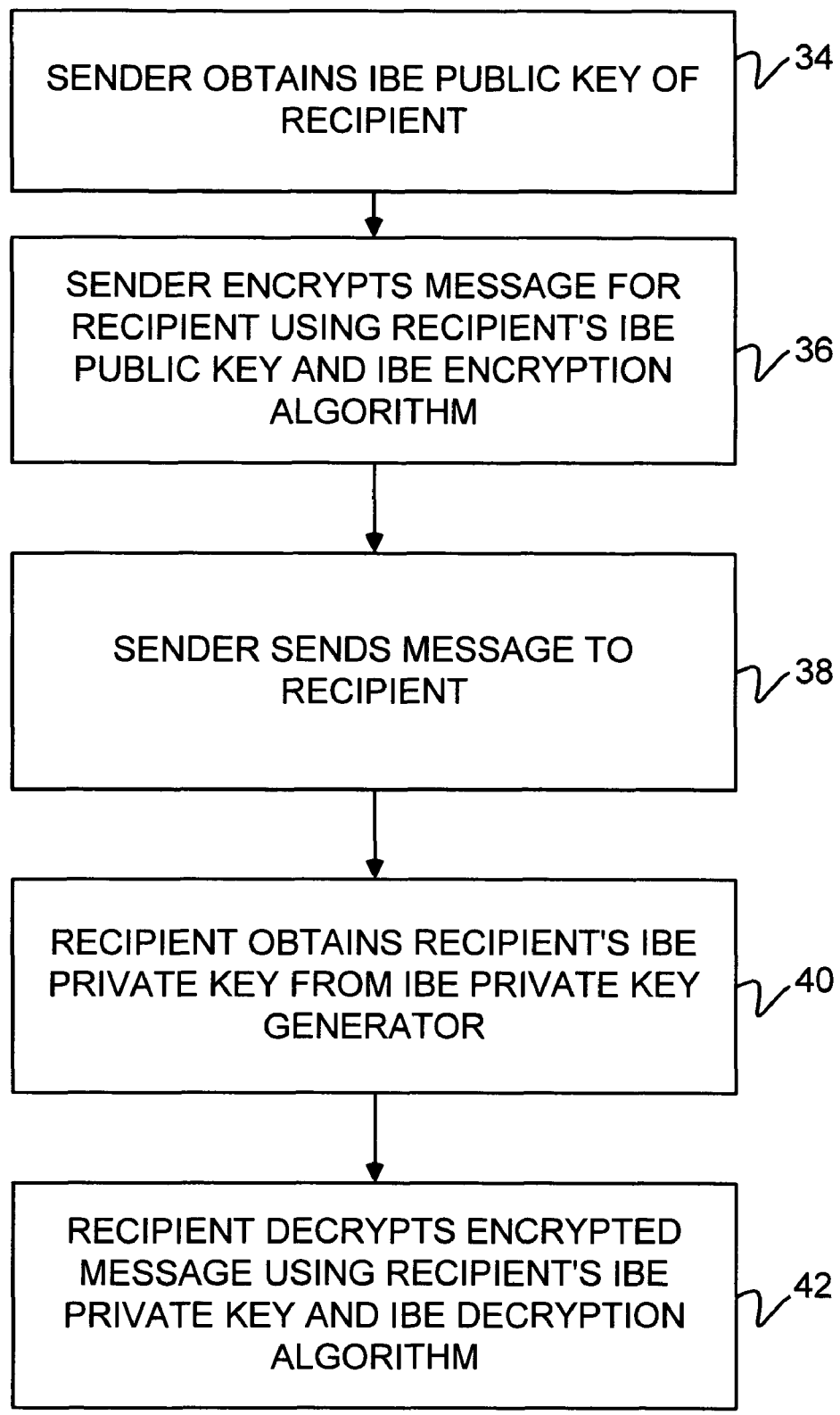
FIG. 5 is a flow chart of illustrative steps involved in using the IBE-based system components of FIG. 4 in accordance with the present invention.

Illustrative steps involved in using an IBE encryption scheme to convey secure messages from a sender to a recipient using the system configuration of FIG. 4 are shown in FIG. 5. At step 34, the sender obtains the IBE public key of the intended recipient (e.g., by determining the recipient's email address).

Once the sender has composed the message to be encrypted, the sender uses the IBE encryption algorithm (implemented using an IBE encryption engine running on the sender's equipment) to encrypt the message (step 36). The IBE encryption engine encrypts the unencrypted version of the message using the identity of the intended recipient (i.e., the intended recipient's IBE public key Q) and the IBE public parameter information (e.g., P and sP).

At step 38, the sender sends the IBE-encrypted version of the message to the recipient (e.g., by transmitting the encrypted message over network 14).

At step 40, the recipient obtains the recipient's IBE private key. For example, the recipient may obtain the recipient's IBE public key from IBE private key generator 32 electronically over network 14. Step 40 may be performed during a set-up process (which could take place at any suitable time) or may be performed after the recipient receives the encrypted message and is informed of the need to obtain the IBE private key.

At step 42, the recipient uses the IBE decryption algorithm (implemented using an IBE decryption engine running on the sender's equipment) to decrypt the encrypted message and to thereby provide the recipient with access to the unencrypted contents of the message. The IBE decryption engine decrypts the encrypted message using the IBE private key of the recipient.

The basic PKE and IBE encryption schemes described in connection with FIGS. 2-5 are suitable in system environments in which recipients are able to locally run their own decryption software. A message recipient having the appropriate PKE or IBE private key and the appropriate PKE or IBE decryption engine may decrypt incoming messages that the sender encrypted using a corresponding PKE or IBE public key and a PKE or IBE encryption engine.

Recipients may not always have the appropriate decryption engine installed on their equipment, at least initially. If desired, recipients may be provided with an opportunity to download an appropriate decryption engine plug-in from a remote server. Sometimes, however, recipients may be reluctant to download and install new software on their equipment or may be restricted from doing so by rules imposed by their system administrator. For example, the network administrator in an organization may have rules preventing the unauthorized installation of software on user terminals. Even though a recipient may be able to obtain permission to install cryptographic software, the process of obtaining this permission may take time or be burdensome.

To allow recipients to receive encrypted messages even when it is not desired or not possible to load the decryption engine on their user equipment 12, system 10 may have servers that are able to implement a suitable PKE or IBE decryption engine. When configured in this way, the servers can obtain the necessary PKE or IBE private keys of the recipients to use during message decryption. The resulting decrypted message contents may be provided to the recipients over secure communications links such as secure communications links using the secure sockets layer (SSL) protocol.

Figure 6:
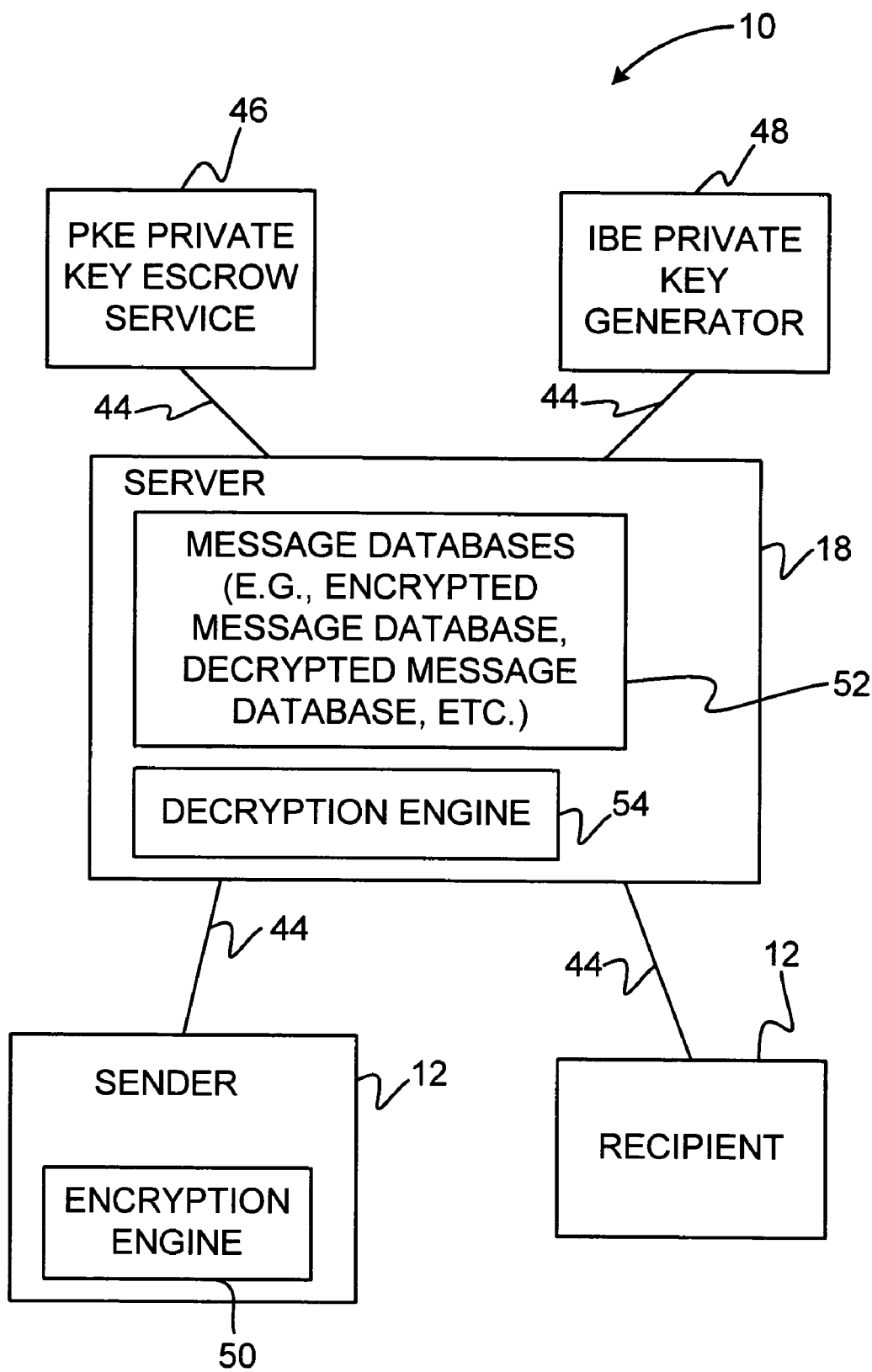
FIG. 6 is a diagram of an illustrative secure messaging system in accordance with the present invention.

An illustrative arrangement in which system 10 has a server 18 that performs message decryption functions is shown in FIG. 6. The components of system 10 that are shown in FIG. 6 are interconnected by communications paths 44. Paths 44 may be any suitable paths through network 14 (FIG. 1). Although shown separately in FIG. 6, server 18 may also be considered to be part of network 14 (as shown in FIG. 1) and its functions may be implemented using one or more computers at one or more locations. Server 18 may be associated with a third-party service or the recipient's organization.

Server 18 may be used to implement a decryption engine 54 for decrypting encrypted messages. The server 18 may interact with entities or equipment such as PKE private key escrow service 46 and IBE private key generator 48 to obtain the appropriate PKE and IBE private keys needed to decrypt messages for various message recipients. Server 18 may then provide the recipient with access to the decrypted content of the messages over a secure communications link (e.g., over a suitable path 44 in network 14).

System configurations in which system 10 supports both PKE and IBE encryption will be described for generality. This type of system arrangement is, however, merely illustrative. System 10 may support any suitable encryption schemes. For example, secure messaging may be supported using only PKE-based encryption, using only IBE-based encryption, using both PKE and IBE encryption, etc.

As shown in FIG. 6, an encryption engine 50 is implemented on the sender's equipment 12. The encryption engine 50 is used by the sender to encrypt messages prior to transmission to a desired recipient or recipients over the network 14 (e.g., paths 44 in FIG. 6). The encryption software 50 on the sender's equipment may be preinstalled on the sender's equipment, may be installed from a disk, or may be downloaded onto the sender's equipment from a remote server. The encryption engine software 50 may include a PKE encryption engine such as an RSA encryption engine and/or an IBE encryption engine such as an IBE encryption engine using an IBE scheme of the type described in the work of Boneh and Franklin.

Decryption engine 54 on server 18 may be preinstalled on the server 18, may be installed on the server 18 from a disk, or may be downloaded onto the server 18 from a remote server. The decryption engine software 54 may include a PKE decryption engine such as an RSA decryption engine and/or an IBE decryption engine such as an IBE decryption engine using an IBE scheme of the type described in the work of Boneh and Franklin or any other suitable IBE scheme. When the sender encrypts messages using PKE, the server 18 can decrypt those messages using PKE. When the sender encrypts messages using IBE, the server 18 can decrypt those messages using IBE.

Server 18 may have databases 52 for supporting secure messaging functions. For example, an encrypted message database may be used to store encrypted messages before (or after) they have been decrypted and a decrypted message database may be used to store messages after they have been decrypted. The encrypted message database may be used to retain messages until the intended recipient of the message can be contacted to determine whether access to the message is desired. The decrypted message database may be used to store decrypted versions of messages before and after they have been provided to the recipient. If desired, a database such as the decrypted message database may be used to support mailbox functions (e.g., to provide a recipient with an electronic "in-box" and other mailbox lists of messages). Databases 52 may be operated across multiple computers or servers at multiple locations if desired.

When PKE encryption is used to encrypt a message for a given recipient, the server 18 may obtain an appropriate PKE-private key for that recipient from PKE private key escrow service 46 (or from the recipient, a PKE private key generator, or other suitable source). Recipients who desire to decrypt messages, but who know that they cannot or do not want to install message decryption engine software on their user equipment 12, can provide their PKE private keys to PKE private key escrow service 46 for later retrieval by authorized parties such as server 18.

When IBE encryption is used to encrypt a message for a given recipient, the server 18 may obtain the given recipient's IBE private key from IBE private key generator 48 (or from the recipient or other suitable source).

Figure 7A:
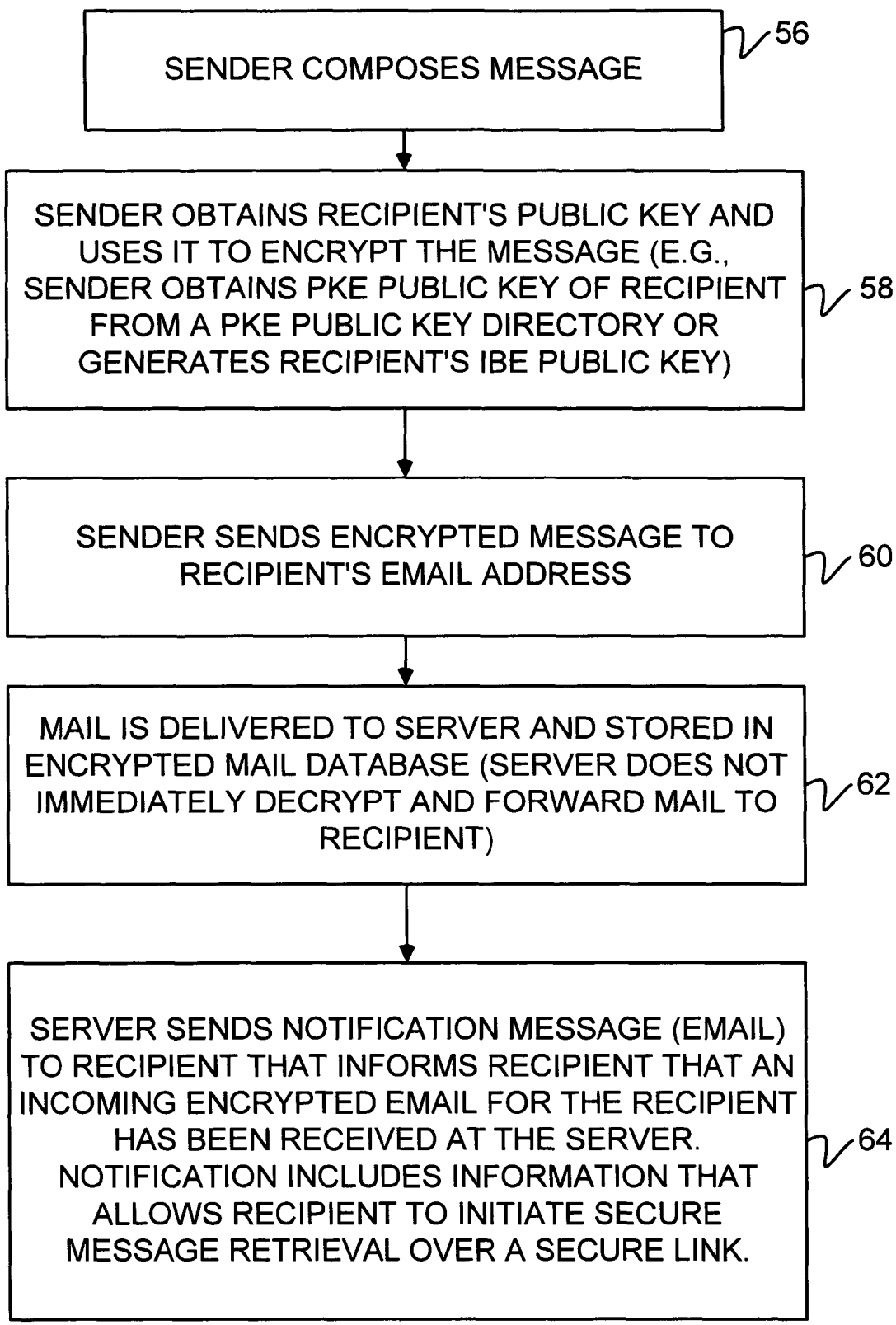
FIGS. 7a and 7b contain a flow chart of illustrative steps involved in using the system of FIG. 6 to send secure messages from a sender to a recipient in accordance with the present invention.
Figure 7B:
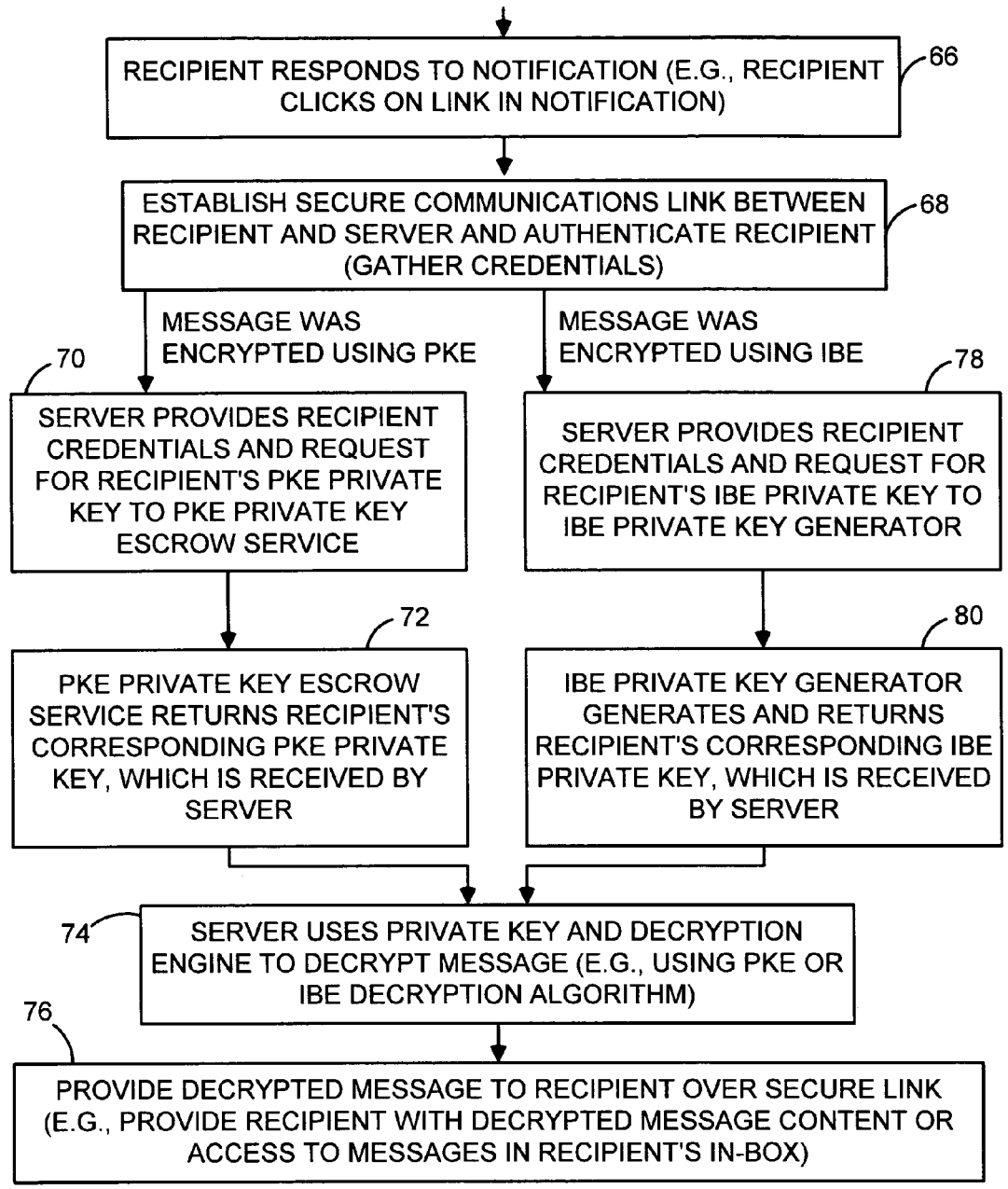

Illustrative steps involved in sending secure messages from a sender to one or more recipients in system 10 are shown in FIGS. 7a and 7b. At step 56 of FIG. 7a, a sender at user equipment 12 (FIG. 6) may compose a message (e.g., a text message, a message containing audio or video content, a message containing executable code, etc.). The sender may compose the message by typing a text message, by cutting-and-pasting from existing documents, by attaching or otherwise incorporating media files into a message, or by using any other suitable technique to create content and select which content is to be part of the message.

At step 58, the sender may obtain the public key of a given recipient. For example, the sender may obtain the recipient's PKE public key from a PKE directory on which the recipient had previously published the PKE public key. If the sender desires to send an IBE-encrypted message, the sender can generate the IBE public key of the recipient from known rules and from the recipient's known identity. For example, the IBE public key of the recipient may be the recipient's email address or the recipient's email address concatenated with the current date, etc. If desired, the sender may obtain the PKE or IBE public key of the given recipient directly from the recipient (e.g., in an email) or from another suitable source. After the sender has obtained the PKE or IBE public key of the recipient, the sender may use encryption engine 50 (FIG. 6) to encrypt the message using PKE encryption or IBE encryption as appropriate.

The sender may send the encrypted message to the recipient at step 60. If, for example, the encrypted message is an email message, the sender may send the encrypted email message by sending it to the known email address of the recipient.

During transmission of the encrypted message, the message may be routed through one or more servers (e.g., one or more servers in the Internet and one or more servers in the user's organization). At step 62, the message that is destined for the recipient is delivered to server 18 of FIG. 6 on its way to the recipient. Server 18 of FIG. 6 may be a server within the user's organization (e.g., a Microsoft Exchange server on the user's LAN) or a third-party server. Because the recipient (in this example) is not assumed to have appropriate decryption engine software installed on the recipient's user equipment 12, the server 18 may retain the encrypted message rather than immediately passing the encrypted message to the recipient as would be the case for a regular (unencrypted) message delivery. The server 18 can detect that the message is encrypted by examining the characteristics of the message payload or by checking for a code (e.g., in a particular field in the message) that indicates to the server that the message is encrypted (and that may also identify the type of encryption used).

At step 64, the server 18 (which has just received the encrypted message) notifies the recipient of the encrypted message. For example, the server 18 may notify the recipient that the server 18 has received an encrypted message addressed to the recipient message and that the encrypted message has been stored in an encrypted message database 52 operated by the server 18. One suitable way in which the server may notify the recipient of the message is to send a notification message (e.g., a notification email message) to the recipient.

The notification message may contain informative text such as "you have an encrypted message to be viewed." The notification may include information that allows the recipient to initiate the process of securely retrieving the decrypted contents of the message. For example, the notification may include information on a web site (e.g., a web site on the server) that the recipient should visit to obtain the decrypted version of the email or the notification may contain an interactive message prompt (a selectable option) that the user may select to automatically initiate the retrieval process. With one suitable approach, the server may include a URL or other clickable link in the notification email that serves as an interactive message prompt that the recipient can click on to initiate message access. The URL can have associated text that informs the recipient on how to proceed (e.g., "click here to view the message").

After the server sends the notification message at step 64 of FIG. 7*a*, the recipient may respond to the notification message from the server 18 at step 66 of FIG. 7*b*. For example, the recipient may click on a link in a notification email. The server 18 monitors the recipient's response (e.g., by awaiting the recipient's request for the web page associated with the clickable link).

When the recipient responds to the notification (i.e., by clicking on the link to initiate message retrieval), the server 18 and recipient's equipment 12 may establish a secure communications link (e.g., an SSL link or TLS link) between the server 18 and the recipient's equipment and may authenticate the recipient at step 68. If desired, some of the communications between the server and the recipient can be provided over an unsecure link (e.g., the notification message of step 64, welcoming web pages or other non-sensitive information provided during the authentication process, and other information can be provided over an unsecure link). During sensitive portions of the recipient authentication process and during the delivery of decrypted message content, the link between server 18 and the recipient is preferably secure (e.g., the SSL or TLS protocols are being used to support secure communications).

During the authentication process of step 68, the server 18 may gather authentication information from the recipient (e.g., the recipient's credentials). The server 18 may use the information that is gathered from the recipient to demonstrate to the PKE private key escrow service 46 and the IBE private key generator 48 that the server 18 is authorized to obtain a copy of the recipient's private key on the recipient's behalf. The server 18 may use the raw recipient credential information obtained from the recipient or may use recipient credential information based on this raw information in obtaining the private key. Once the server 18 has the private key, the server 18 can decrypt the message and provide access to the decrypted message contents to the recipient. If desired, messages may be provided to the recipient in the form of electronic mail "mailboxes," which are groups of messages maintained by server 18. The server 18 may use the recipient's credentials that were gathered from the recipient to determine whether or not to allow a recipient to access a particular mailbox (e.g., to verify the recipient's identity).

Any of the manual and electronic authentication techniques described in connection with FIG. 1 may be used when the server 18 authenticates the recipient (e.g., during step 68). With one suitable authentication approach, the server 18 may present the recipient with one or more interactive web pages over an Internet link. The recipient can access and interact with these web pages using a web browser implemented on the recipient's equipment. During the presentation of at least some of these web pages, the web link between the recipient's web browser may be a secure link (e.g., an https:// link). This allows the recipient to securely provide the server with recipient credentials such as username and password information or other recipient credentials that serve to establish the recipient's identity.

Any suitable recipient credential information may be gathered during the user authentication processes of system 10. The recipient credentials that are gathered from the recipient by the server may include a user ID, a password, a personal identification number (PIN), a cryptographic key, a certificate, biometric information (e.g., fingerprint information, retinal scan information, handprint information, voice print information, etc.), a ticket such as a Kerberos ticket, an access ticket, an authentication ticket, hardware-token-generated information, information provided by a "single sign-on" solution, combinations of such credentials, or recipient credential information based on or derived from such credentials.

The recipient credentials may include information such as ticket information that is gathered in part through the use of third-party servers that interact with the user and server 18 during the authentication process. As an example, the recipient may supply a password to a server that generates a ticket that is then used as that recipient's credentials by server 18.

The recipient credentials include recipient identity information sufficient to specify which private key is desired when server 18 requests a recipient's private key. Recipient credentials may also include authentication information such as passwords, tickets, etc. to help establish permission to access the private key. If desired, the server's permission to access the private key of a recipient may be inferred from context. For example, if the server 18 and private key generator 48 or key escrow service 46 trust each other already, any requests that the server 18 makes to the private key generator 48 or key escrow service 46 will be accepted based on this pre-established relationship.

Recipient credentials can be obtained from a recipient over a secure link that is later used to deliver content to the recipient or separate secure links or secure transfer mechanisms may be used for these operations. If desired, security between the recipient and the server 18 may be provided during the process of gathering the recipient's credentials by sending recipient credential information to the server 18 in a form that is only understood by the server. Recipient credentials may also be encrypted and the encrypted version of the credentials sent to the server 18. Combinations of such approaches may be used to ensure security for the recipient credentials. These are merely illustrative techniques that may be used to gather recipient credential information. Any suitable arrangement for obtaining recipient credential information may be used if desired.

If the server 18 received a message at step 62 that was encrypted using PKE encryption, at step 70 the server may present the recipient's credentials to the PKE private key escrow service 46 (FIG. 6) with a request that the PKE private key escrow service 46 provide that recipient's PKE private key to the server 18. (The PKE private key escrow service 46 may have previously obtained the PKE private keys of users directly from the users, through a user's organization, from a PKE private key generator within escrow service 46, or from any other suitable source).

The PKE private key escrow service 46 may examine the recipient's credentials to determine whether they match the credentials associated with one of the PKE private keys maintained by the PKE private key escrow service. If a valid match is located, the PKE private key escrow service 46 may release the appropriate recipient's requested PKE private key to the server 18 at step 72 (e.g., the recipient's PKE private key may be returned to the server 18 over a communications path 44).

If the server 18 received a message at step 62 that was encrypted using IBE encryption, the server 18 may present the recipient's credentials to the IBE private key generator 48 (FIG. 6) at step 78 with a request that the IBE private key generator 48 provide the recipient's IBE private key to the server 18. The IBE private key generator 48 can generate IBE private keys in real time based on recipient identity information such as the recipient's email address or the IBE private key generator 48 can retrieve previously-generated IBE keys from a database.

The IBE private key generator 48 may examine the recipient's credentials provided by the server 18 to determine whether that recipient is authorized to receive the IBE private key. If the IBE private key generator 48 determines that the recipient is authorized, the IBE private key generator 48 may provide that recipient's IBE private key to the server 18 at step 80.

After the server 18 has received the recipient's PKE private key at step 72 or has received the recipient's IBE private key at step 80, at step 74 the server may use the PKE or IBE private key to decrypt the encrypted message that was received from the sender at step 62. The decryption engine 54 that is implemented on the server 18 may be used during the decryption process. The server 18 may retain a copy of the decrypted version of the message in a database 52 (e.g., a decrypted message database).

Figure 8:
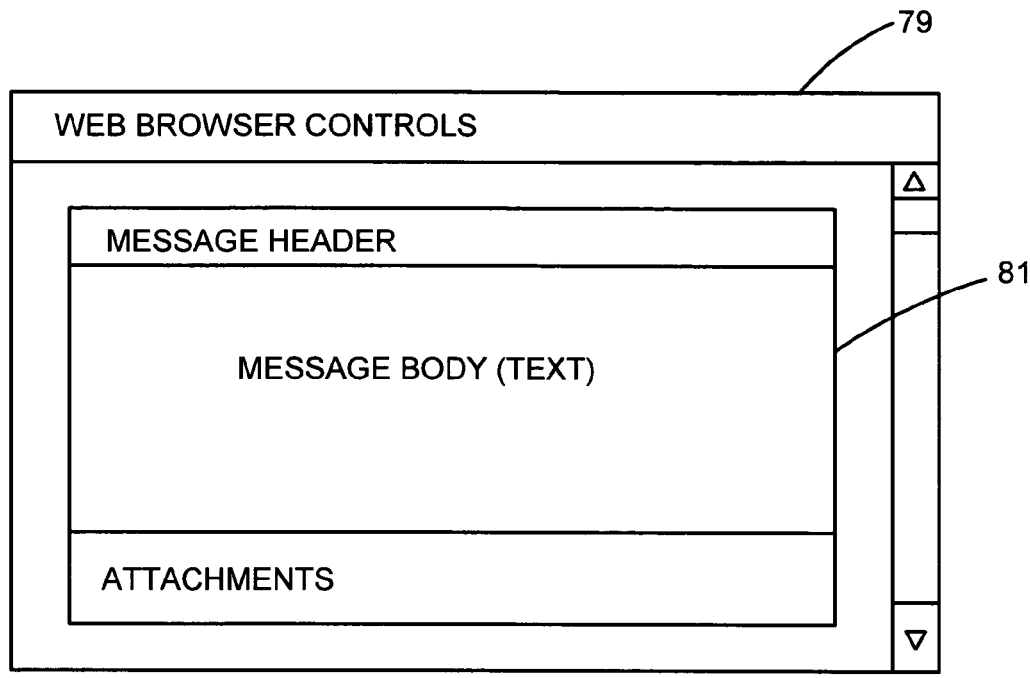
FIG. 8 shows an illustrative screen that may be displayed to a message recipient when the recipient is accessing the contents of a decrypted message over a secure communications link with a server in accordance with the present invention.

At step 76, the server 18 may provide the recipient with access to the content of the decrypted message. For example, the decrypted message content may be provided to the recipient by the server 18 over a secure communications link (e.g., an SSL or TSL link that was established at step 68). With one suitable approach, the server 18 may present the message to the recipient over the secure link in the form of a web page. An illustrative web page 79 in which a decrypted message 81 is presented to a recipient by server 18 over a secure communications link is shown in FIG. 8. In the example of FIG. 8, the recipient may view the message content using a web browser interface.

Figure 9:
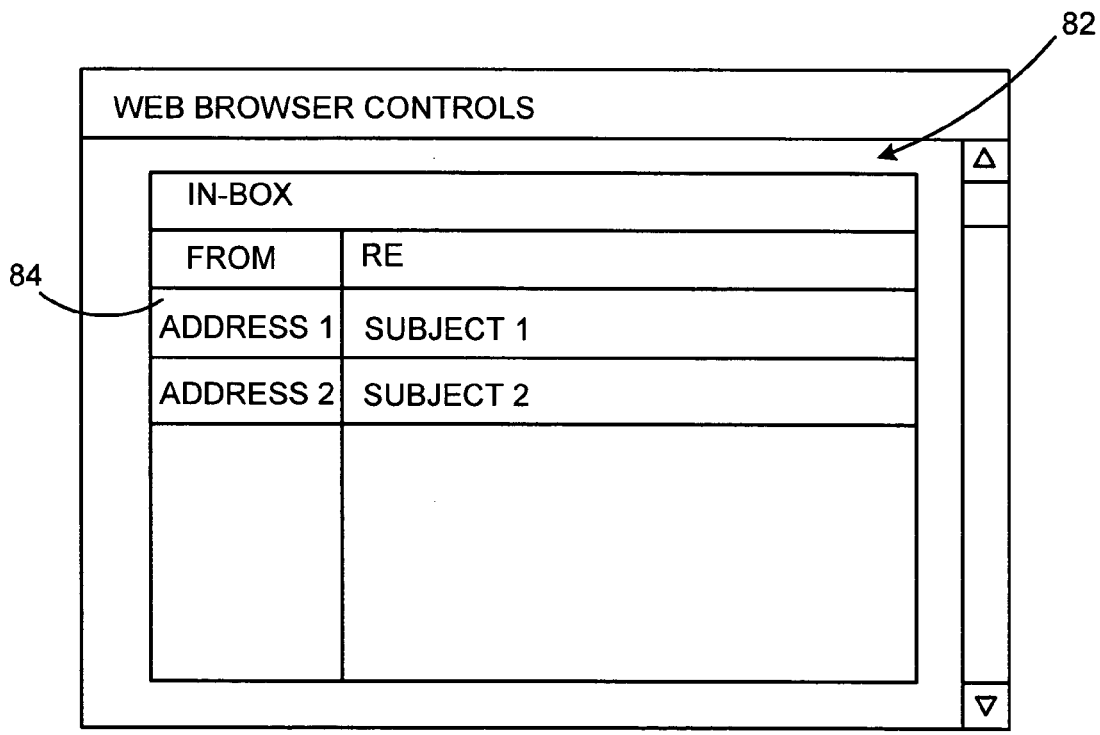
FIG. 9 shows an illustrative screen that may be displayed to a message recipient when the recipient is viewing a message in-box that provides access to decrypted messages over a secure communications link with a server in accordance with the present invention.

As another example, the server 18 may provide the recipient with access to decrypted messages using a "mailbox" interface. With this approach, which is illustrated in the example of FIG. 9, the server 18 may display one or more lists of available messages for the recipient such as a list of in-box messages 82. The list 82 of available messages that the recipient may access may include the most recently decrypted message (e.g., message 84 in this example).

The recipient may view the content of the listed decrypted messages using any suitable approach. For example, the recipient may click on a listed message to direct the server to retrieve that message and display its contents on a web page. The web page may be delivered to the recipient's web browser over the secure communications link between the server 18 and the recipient.

If a secure communications link does not exist when it is time for the server 18 to provide the recipient with access to the message (e.g., if the secure connection between the server and recipient that was established when the recipient's credentials were being gathered is not active), the server 18 and the recipient's equipment may establish such a secure link to use in providing secure message access. An advantage of using protocols such as the SSL protocol to support secure communications between the server and the recipient is that the software used to support this type of protocol is already included in standard web browsers. Accordingly, the secure links between the sever and the recipient may be established without requiring the recipient to install new software. These are merely illustrative arrangements for server 18 to use to provide the recipient with access to the decrypted message over a secure communications link. Any suitable arrangement that allows the recipient to access the decrypted content of the message may be used if desired.

Figure 10A:
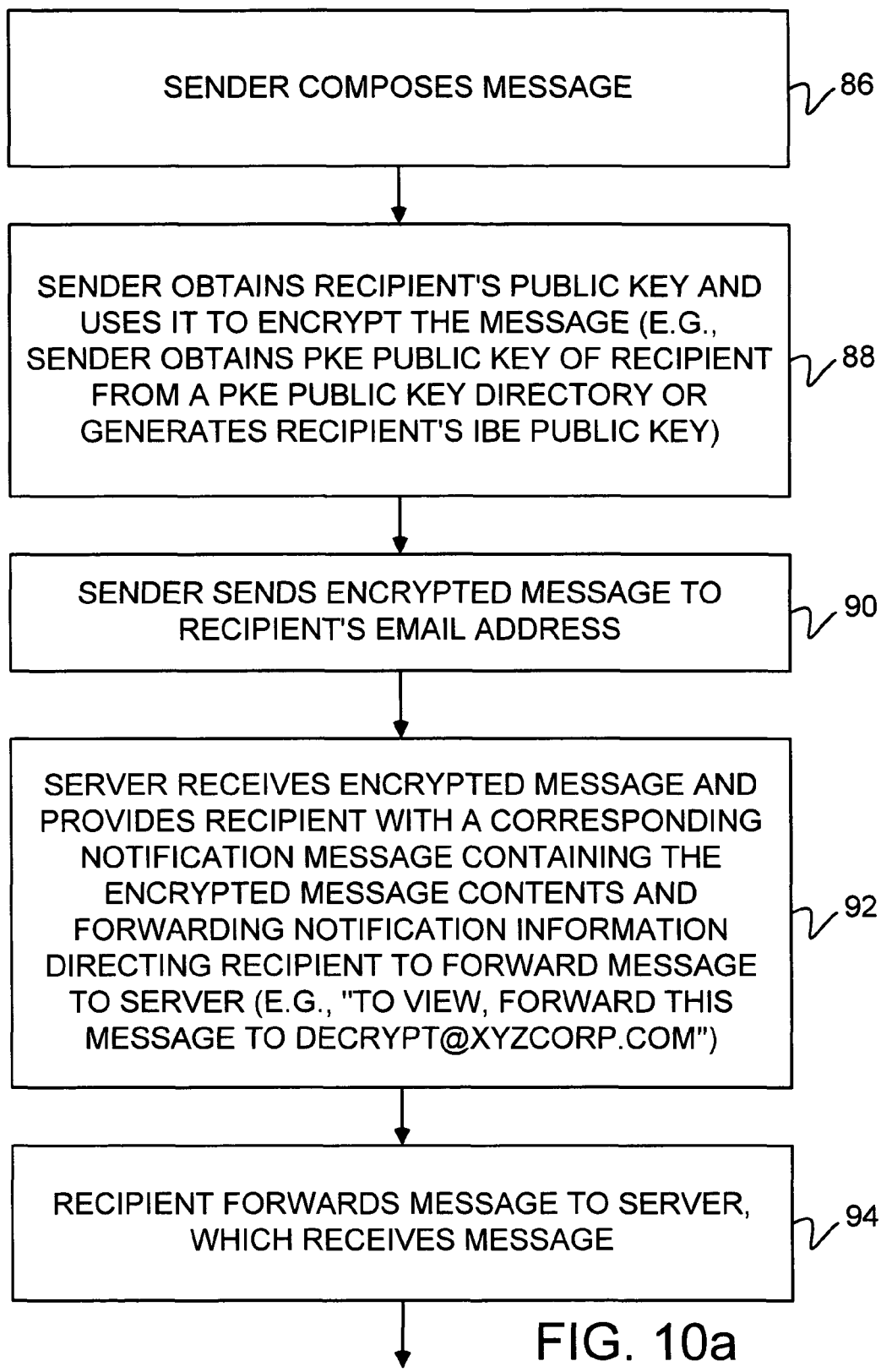
FIGS. 10a and 10b contain a flow chart of illustrative steps involved in using the system of FIG. 6 to send secure messages from a sender to a recipient in accordance with the present invention.
Figure 10B:
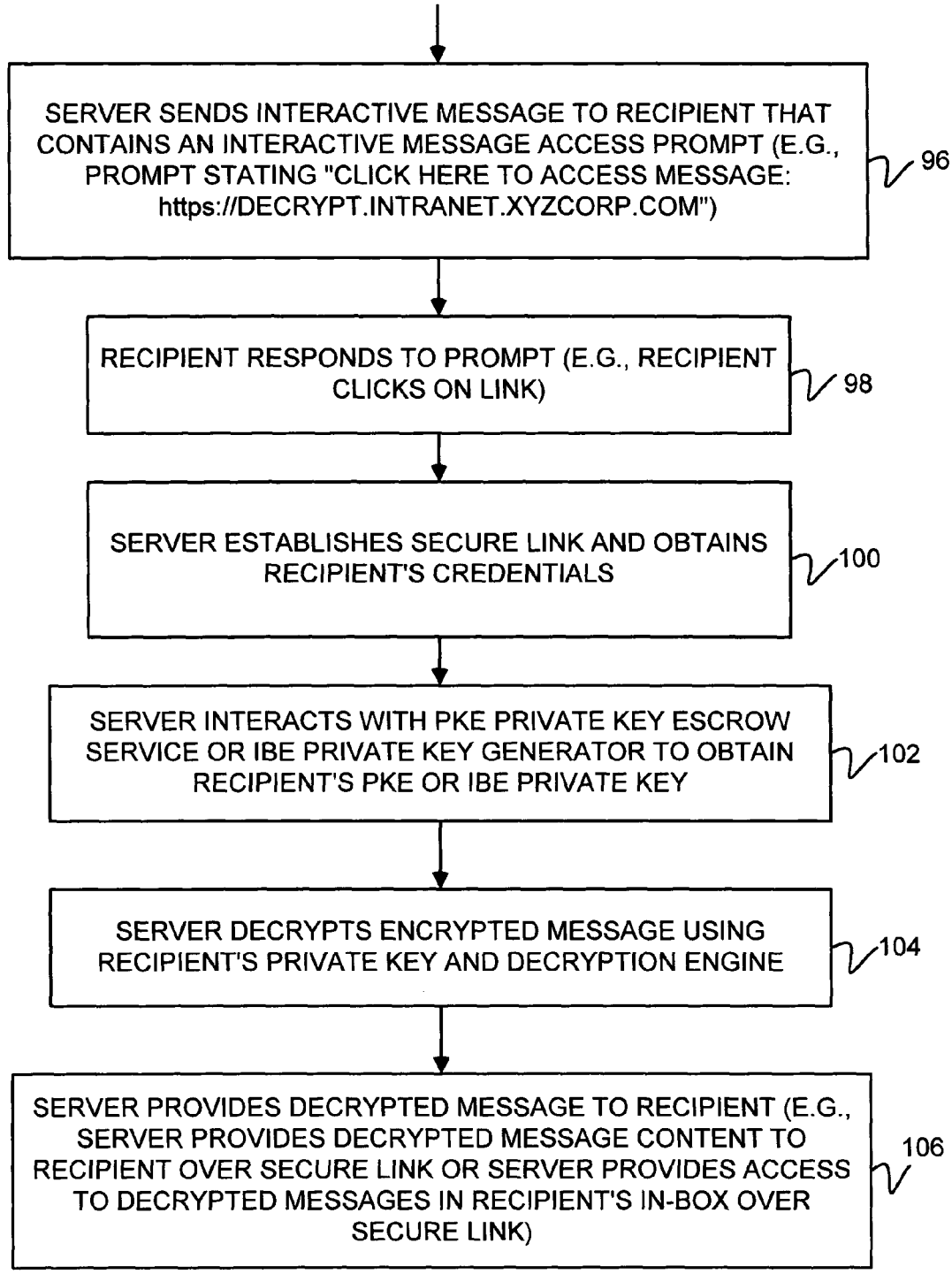

If desired, the recipient can forward encrypted messages to server 18 for decryption. Illustrative steps involved with one such "forwarding" approach are shown in FIGS. 10a and 10b.

At step 86, the sender may compose a message (e.g., a message containing text, audio, video, code, etc.).

At step 88, the sender may obtain the PKE or IBE public key of an intended recipient. For example, the sender may obtain the PKE public key of the recipient from a PKE public key director or from the recipient or other source. The sender may obtain the IBE public key of the recipient by generating it based on known rules (e.g., the IBE public key may be the email address of the recipient concatenated with the current date) or by obtaining it from the recipient or other suitable source. After the PKE or IBE public key of the recipient has been obtained, the sender may use encryption engine 50 (FIG. 6) and the public key to encrypt the message.

The sender may send the encrypted message to the recipient's email address at step 90. In this example and the other examples described herein, the sender may send a message to multiple recipient's in parallel if desired. Single-recipient scenarios are discussed to clarify the discussion.

Server 18 (which may be, for example, a third party server in the communications path between the sender's equipment 12 and the receiver's equipment 12 or which may be a server associated with the recipient's organization such as the recipient's mail server) may receive (intercept) the encrypted message on its way to the recipient. The server 18 knows (or may assume) that the recipient in this example does not have the appropriate decryption software installed on the recipient's equipment. The server 18 may therefore instruct the recipient to forward the encrypted message to an appropriate entity (e.g., the same server 18 or another suitable decryption server) for decryption. Any suitable technique may be used to notify the recipient of the appropriate server to which the encrypted message should be forwarded.

As one example, server 18 may, upon receipt of the encrypted message at step 92, create a new message (or modify the existing message) to produce a corresponding notification message that contains the contents of the original encrypted message and suitable forwarding notification information. The forwarding notification information directs the recipient to forward the message (i.e., the notification message with its encrypted contents) to an appropriate server (e.g., server 18). The message may be forwarded by using the forward or reply feature in the recipient's email program or other messaging software. An example of suitable forwarding notification information that server 18 may include in the notification message is text such as "to view, forward this message to decrypt@xyzcorp.com" where decrypt@xyzcorp.com is the message address of the server to be used to decrypt the message.

If the recipient desires to view the encrypted contents of the notification message, the recipient forwards the message to the server at step 94, which receives the forwarded message. The recipient may forward the message back to the same server 18 that produced the notification message or to a different decryption server such as a third party server or a server in the recipient's organization. For clarity, the present discussion will focus on the scenario where the recipient forwards the message back to the same server 18. The received message may be stored in a database 54 such as an encrypted message database.

After the server receives the forwarded message at step 94 of FIG. 10*a*, the server may send an interactive message to the recipient at step 96 of FIG. 10*b*. The interactive message may contain an interactive message prompt to which the recipient may respond to initiate the message access process. An example of a suitable interactive message prompt that may be provided in the interactive message is a clickable URL or other link stating "click here to access message: https://decrypt.intranet.xyzcorp.com."

If the recipient is interested in obtaining access to the decrypted contents of the message, the recipient may respond to the interactive message prompt at step 98. The recipient may, for example, click on the URL or other link in the interactive message.

If the recipient responds to the interactive message prompt, the server may establish a secure communications link between the server and the recipient and may gather the recipient's credentials over the secure link at step 100.

At step 102, the server may provide the recipient's credentials to the PKE private key escrow service 46 (FIG. 6) or the IBE private key generator 48 (FIG. 6) with a request for the recipient's private key to attempt to obtain a copy of the recipient's PKE or IBE private key. If the message from the sender was encrypted using PKE techniques, the server will endeavor to obtain the recipient's PKE private key. If the message from the sender was encrypted using IBE techniques, the server will attempt to obtain the recipient's IBE private key. If the recipient's credentials indicate that the server is authorized to obtain a copy of the appropriate private key, the private key may be provided to the server for use in decrypting the encrypted message.

At step 104, the server may use the PKE private key of the recipient or the IBE private key of the recipient that was obtained at step 102 to decrypt the encrypted message. During the decryption process, the server uses the decryption engine 54 to perform the decryption processes of the appropriate decryption algorithm (i.e., PKE or IBE, depending on which encryption process was used). The decrypted message may be stored in a message database 52 such as a decrypted message database.

At step 106, the server may provide the decrypted message from the decryption engine to the recipient. The server may provide the recipient with access to the decrypted content by transferring the decrypted content to the recipient over a secure web link (e.g., using a web browser arrangement of the type shown in FIG. 8). If desired, the recipient may be provided with access to the decrypted message content via a message mailbox format (e.g., using a secure communications link with an approach of the type described in connection with FIG. 9). These are merely illustrative arrangements through which secure access to the decrypted message contents may be provided to the recipient by the server. Any suitable secure message access technique may be provided if desired.

With the "forwarding" approach described in connection with FIGS. 10*a* and 10*b*, a notification message and an interactive message are generated. The notification message is generated when the server receives the encrypted message. The notification message may contain forwarding notification information that instructs the recipient to forward the message to an appropriate location for decryption (e.g., the same server acting as a decryption server or a separate decryption server). The interactive message may contain an interactive message prompt and may be sent to the recipient by the decryption server to provide the recipient with an opportunity to initiate the process of retrieving the decrypted version of the message from the decryption server.

Figure 11A:
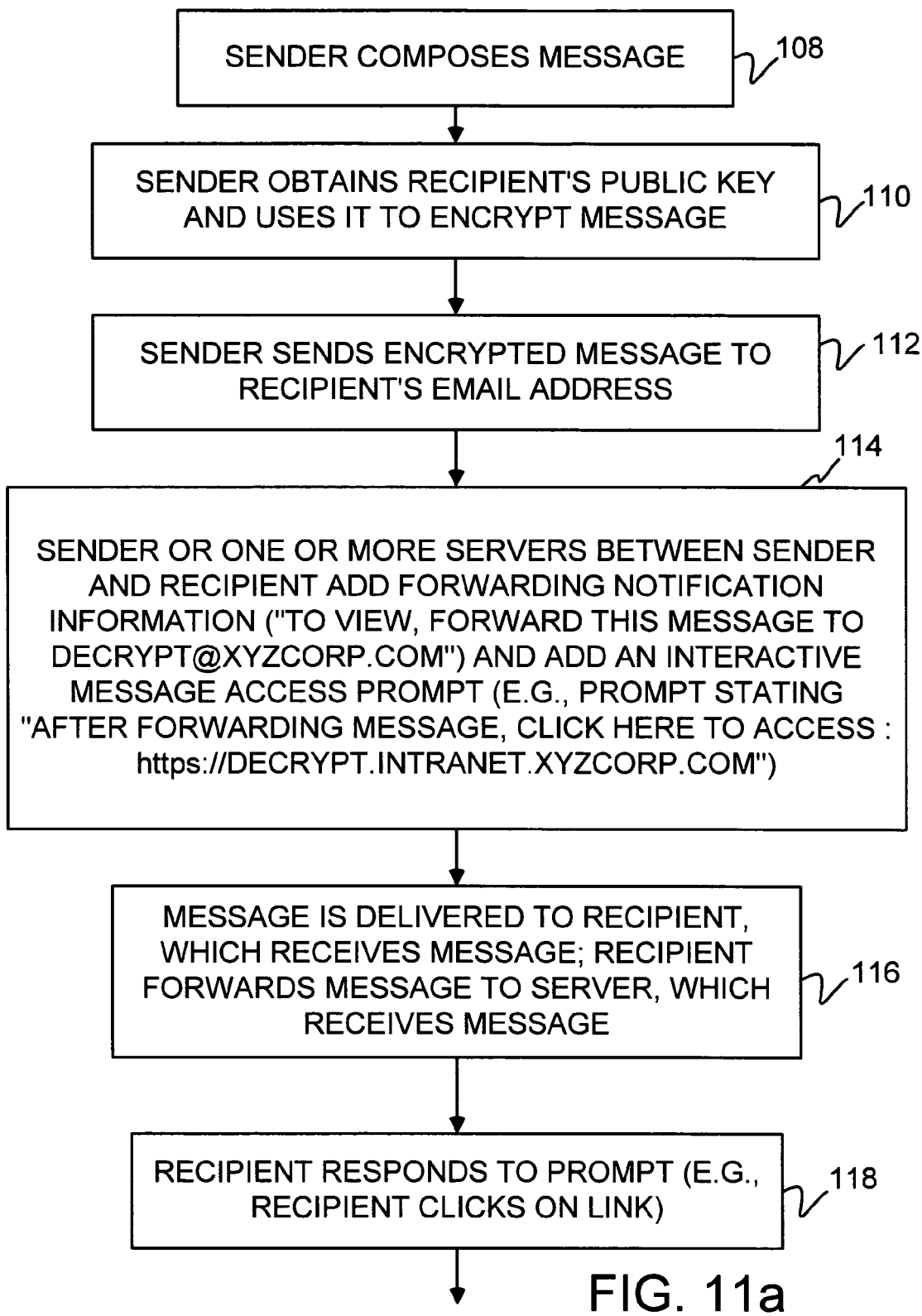
FIGS. 11a and 11b contain a flow chart of other illustrative steps involved in using the system of FIG. 6 to send secure messages from a sender to a recipient in accordance with the present invention.
Figure 11B:
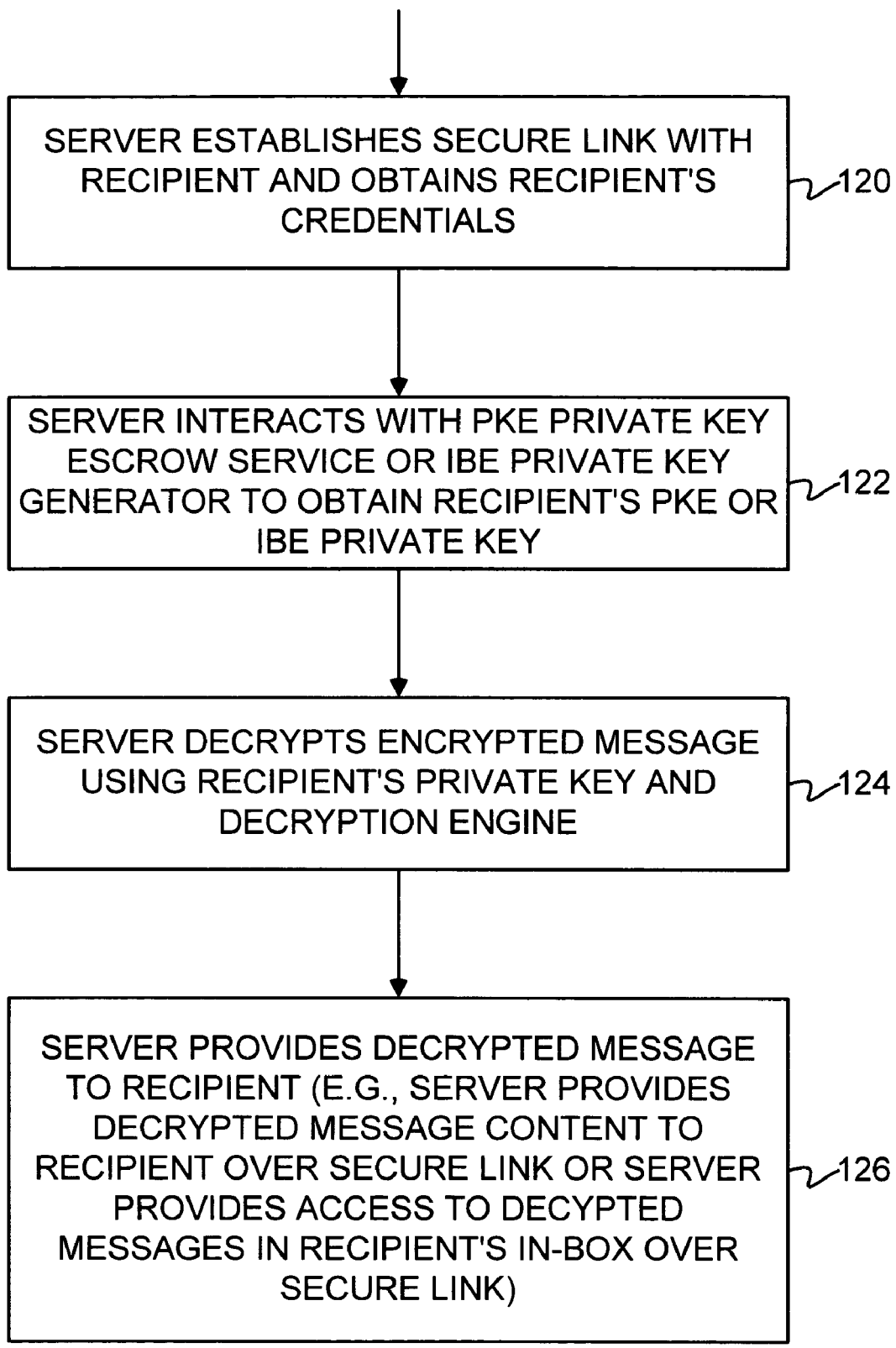

If desired, the interactive message prompt may be included in an earlier message (e.g., the notification message), rather than being provided by the server as a later, separate message. Illustrative steps involved with this type of approach are shown in FIGS. 11*a* and 11*b*.

At step 108, the sender may compose the message to be sent to the recipient.

The sender may obtain the recipient's PKE or IBE public key at step 110. During step 110, the sender may use an appropriate encryption engine 50 (e.g., a PKE or IBE encryption engine) and the public key to encrypt the message.

The sender may send the encrypted message to the recipient's message address (e.g., the recipient's email address) at step 112.

With the approach described in connection with FIGS. 10a and 10b, the server may intercept the message from the recipient and send a corresponding notification message to the recipient that contains forwarding notification information. If the message is forwarded to the server by the recipient, the server may send another message—an "interactive" message containing an interactive message access prompt—to the recipient to which the recipient may respond to obtain access to the decrypted message. With the approach of FIGS. 11a and 11b, the forwarding notification information and the interactive message prompt may be provided to the recipient by the sender (e.g., in a message that also contains the encrypted message contents), by an intermediate mail server (e.g., a server located along a communications path between the sender and the recipient such as a server at the recipient's organization or location), or by a combination of the sender and one or more such servers.

For example, at step 114, the sender and one or more servers between the sender and the recipient may add forwarding notification information to the encrypted message such as "to view, forward this message to decrypt@xyzcorp.com" and may add an interactive message access prompt to the encrypted message such as "after forwarding message, click here to access: https://decrypt.intranet.xyzcorp.com."

The forwarding notification information may be added by the sender or by a downstream server. The interactive message access prompt may also be added by the server or by a downstream server. The forwarding notification information and interactive message access prompt may be "added" to the message by attaching or appending them to the message or by extracting the encrypted message contents from the original message and resending a "new" message that incorporates the contents and forwarding notification information and/or the interactive message access prompt.

With one suitable approach, the sender may, upon creating the encrypted message, include the forwarding notification information with the encrypted message. An intermediate mail server (e.g., a server downstream from the sender such as a mail server at the recipient's location or organization or a third-party mail server) may recognize that the message is encrypted (based on a code in the message or the message's other characteristics) and may add the interactive message access prompt. With another suitable approach, the sender may include both the forwarding notification information and the interactive message access prompt with the original encrypted message. With yet another suitable approach, an intermediate (downstream) server may incorporate both the forwarding notification information and the interactive message access prompt into the encrypted message. With another suitable approach, a first downstream server may be used to add the forwarding notification information to the encrypted message and a second downstream server may be used to add the interactive message access prompt to the encrypted message. These are merely illustrative ways in which the forwarding notification information and the interactive message access prompt information may be added to or associated with the encrypted message at step 114. Any suitable approach may be used if desired.

Regardless of how the forwarding notification information and interactive message access prompt information are associated with the encrypted message, the encrypted message with its forwarding notification information and interactive message access prompt may be delivered (via one or more mail servers including one or more servers at the recipient's organization or location) to the recipient (step 116 of FIG. 11a).

The recipient, upon receiving the encrypted message and the forwarding notification information and interactive message access prompt contained within the encrypted message at step 116, may decide to have the encrypted message contents decrypted. Accordingly, at step 116, the recipient may forward the encrypted message to the server identified in the forwarding notification information (e.g., the server at decrypt@xyzcorp.com in this example) for decryption with decryption engine 54 (FIG. 6). The decryption server receives the forwarded message and may store it in a database 52 (FIG. 6) such as an encrypted message database.

The message received by the recipient includes an interactive message prompt. After the recipient has forwarded the message to the decryption server, the recipient can, at a desired time, respond to this interactive message prompt at step 118. For example, the recipient can open the message with the recipient's email program or other suitable application and can click on the URL or other link in the message.

In contrast to the approach of FIGS. 10a and 10b, with the approach of FIGS. 11a and 11b, the server need not send a separate interactive message to the recipient to provide the recipient with the interactive message prompt, because the recipient already has access to the interactive message prompt by virtue of having received it with the original encrypted message.

The server, having received the forwarded encrypted message from the recipient at step 116 (FIG. 11a) and having received a response from the recipient at step 118 (FIG. 11a), may proceed to decrypt the encrypted message, as shown in FIG. 11b.

When the server 18 detects that the recipient has clicked on the interactive message access prompt, the server may establish a secure communications link with the recipient and may obtain the recipient's credentials over the secure link at step 120 (FIG. 11b).

At step 122, the server may the use the recipient's credentials to demonstrate to the PKE private key escrow service 46 (FIG. 6) or the IBE private key generator 48 (FIG. 6), as appropriate, that the server is authorized to obtain a copy of the recipient's PKE private key or the recipients IBE private key. In a system using PKE-encrypted communications, the server obtains the recipient's PKE private key by presenting the recipient's credentials to the PKE private key escrow service 46. In a system using IBE-encrypted communications, the server obtains the recipient's IBE private key from IBE private key generator 48.

At step 124, the server may, using a PKE or IBE decryption engine 54 (FIG. 6) and the recipient's private key, decrypt the encrypted message. The decrypted version of the message may be stored in a database 52 (e.g., a decrypted message database).

At step 126, when the recipient is communicating with the server over a secure link after responding to the interactive message access prompt at step 118, the server may provide the recipient with access to the decrypted message. The server may provide message content access using a web-based approach of the type described in connection with FIG. 8, using a web-based mailbox list approach of the type described in connection with FIG. 9, or using any other suitable approach.

Figure 12:
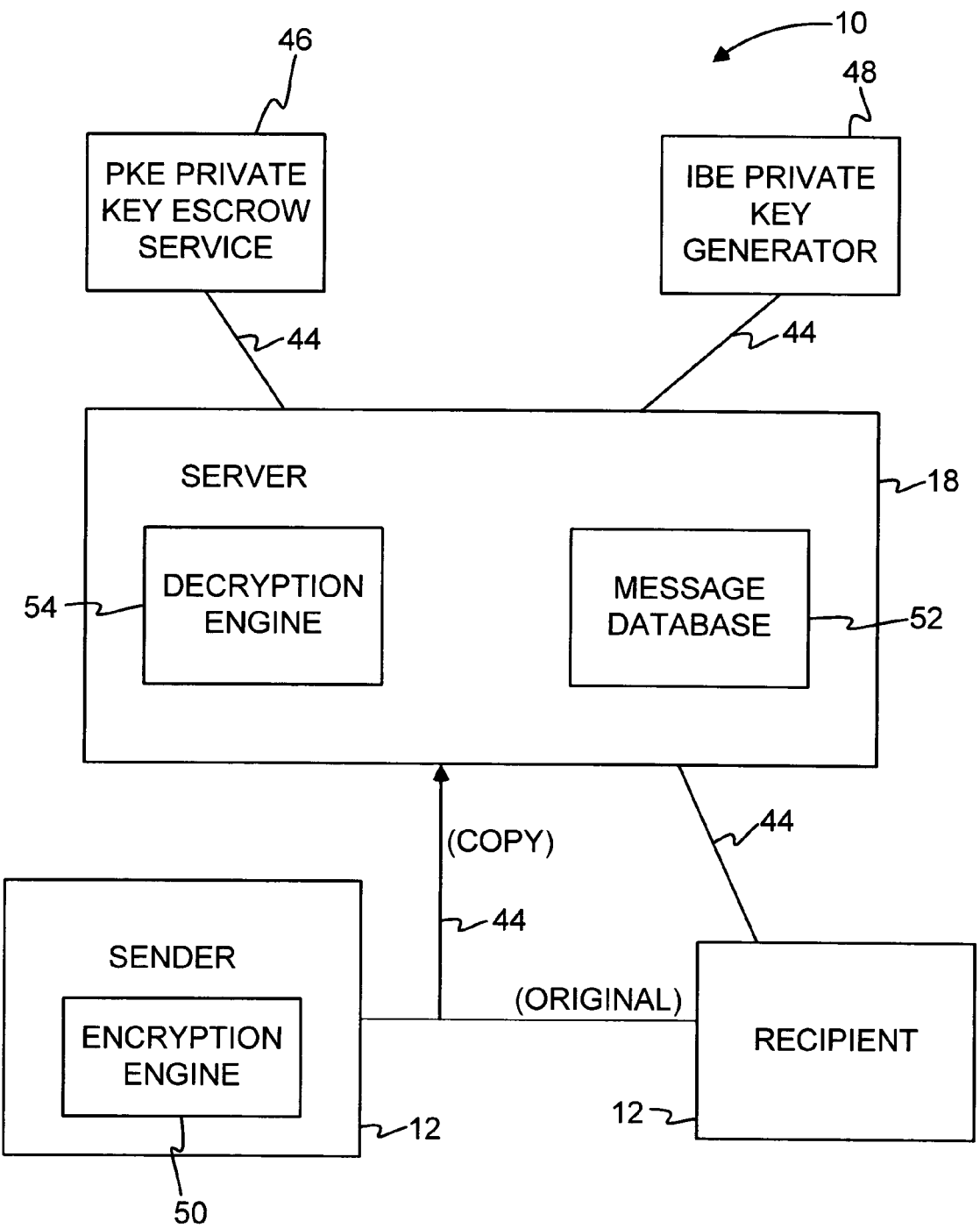
FIG. 12 is a diagram of an illustrative system configuration that may be used to provide secure messaging when a sender sends a copy of a message to a server when sending the message to a message recipient in accordance with the present invention.

The forwarding process of the approaches described in connection with FIGS. 10a and 10b and FIGS. 11a and 11b is not necessary if the sender provides a copy of the encrypted message to the server. As shown in FIG. 12, the sender, after using encryption engine 50 to encrypt a message with PKE encryption or IBE encryption, can send an original version of the encrypted message to the recipient and can send a copy of the encrypted message to a server 18. Server 18 can retain the message in database 52 (e.g., in an encrypted message database). When directed by the recipient, the server 18 can decrypt the message and can provide the recipient with access to the decrypted contents of the message. Because the sender provided the server with a copy of the encrypted message to the server (e.g., as a cc or bcc or equivalent when first sending the message or in a separate transmission), the recipient need not forward a copy of the encrypted message to the server.

In the depiction of FIG. 12, an original version of the encrypted message is shown is traveling directly from the sender to the recipient along a network communications path 44 and a copy of the encrypted message is shown as traveling directly from the sender to the decryption server along another network communications path 44. Although this depiction is conceptually correct, it will be appreciated that during delivery the copy and original messages may both initially be transmitted to the same server 18 (e.g., a mail server at the recipient's location). The server 18 may retain a version of the encrypted message in database 52 ("the copy") and may pass another version of the encrypted message (the "original") to the recipient.

Figure 13:
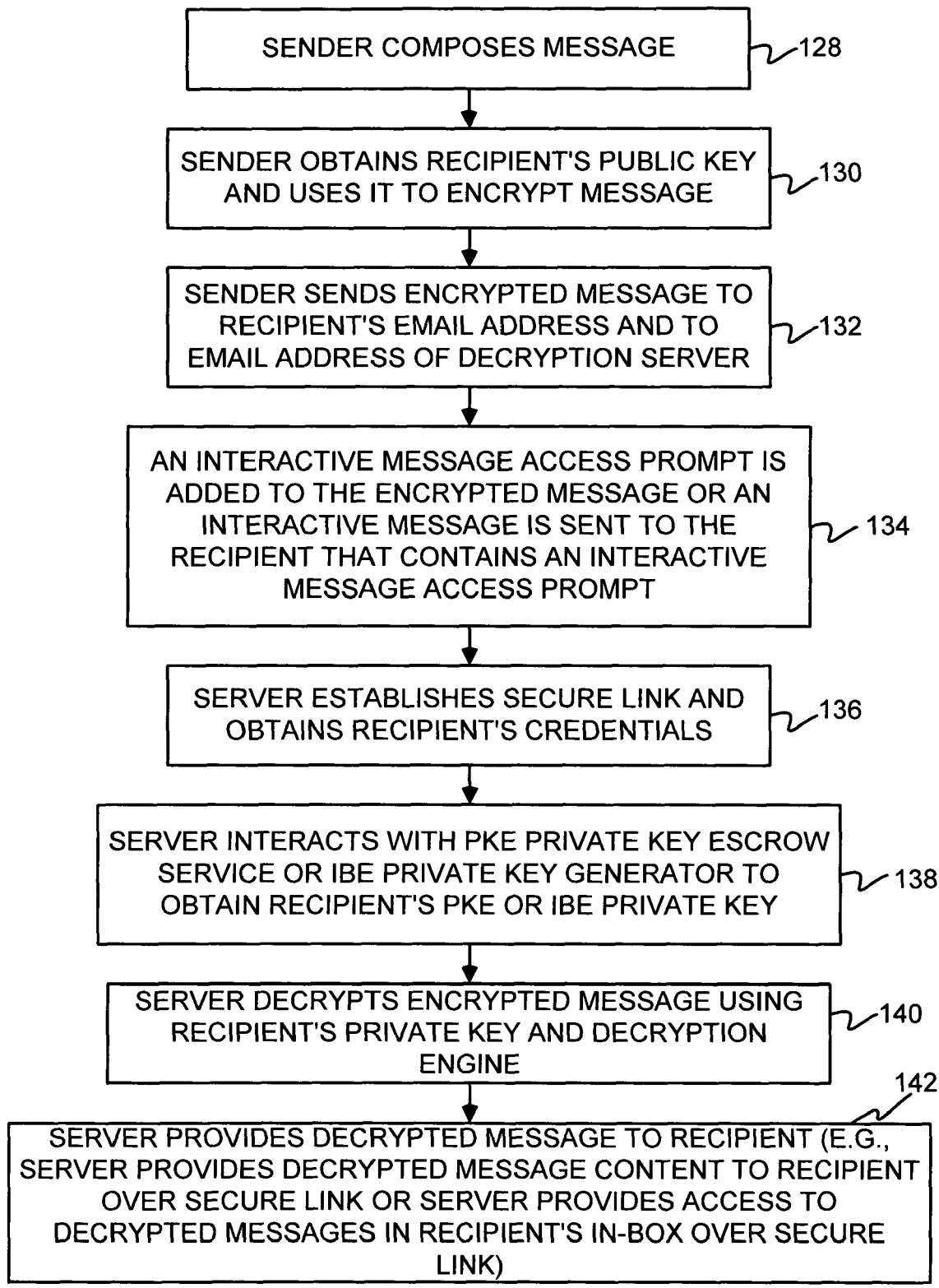
FIG. 13 is a flow chart of illustrative steps involved in using the system of FIG. 12 to send secure messages from a sender to a recipient in accordance with the present invention.

Illustrative steps involved in using the arrangement of FIG. 12 to support secure messaging between a sender and recipient are shown in FIG. 13. At step 128, the sender may compose a message for a recipient.

At step 130, the sender may obtain the recipient's public key (e.g., the recipient's PKE or IBE public key). Using decryption engine 50 (FIG. 12) and using the recipient's public key, the sender may encrypt the message for the recipient.

At step 132, the sender may send the encrypted message to the recipient's email address and to the email address of the decryption server (e.g., server 18 of FIG. 12). The encrypted messages sent to the recipient's email address and to the email address of the decryption server may be sent by the sender's email program or other messaging software at the same time (e.g., by using the cc or bcc functions of the software) or may be sent at different times. The copy of the message that is addressed to the recipient may be considered to be an "original" and the copy of the message that is addressed to the server may be considered to be a "copy." Because the recipient need not forward the message to the server for decryption, it is not necessary to include forwarding notification information in the message.

At step 134, an interactive message access prompt may be added to the encrypted message or a separate interactive message may be sent to the recipient that contains an interactive message prompt. The interactive message access prompt may be a clickable link such as a URL or any other suitable selectable link or option to which the recipient may respond to initiate message access. The interactive message access prompt may be added to the encrypted message by the sender (e.g., as part of the original message) or by a downstream server such as the decryption server. If desired, a server (e.g., the decryption server) may generate and send a separate interactive message to the recipient that contains the interactive message access prompt.

When the recipient responds to the interactive message prompt (e.g., from within the original encrypted message or from within a separate interactive message), the server may establish a secure communications link with the recipient and may obtain the recipient's credentials (step 136). The secure communications link may be, for example, an SSL link formed using a web browser. The recipient's credentials may be, for example, a user name and password.

At step 138, the server may present the recipient's credentials to the PKE private key escrow service 46 of FIG. 12 (when the encrypted message is a PKE-encrypted message) or may present the recipient's credentials to the IBE private key generator 48 of FIG. 12 (when the encrypted message is a IBE-encrypted message). When the recipient's credentials have been authenticated, the requested PKE or IBE private key of the recipient may be returned to the server.

At step 140, the server may use the PKE or IBE private key of the recipient and the PKE or IBE decryption engine 54 that is implemented on the server to decrypt the encrypted message (e.g., to decrypt the copy of the encrypted message that was initially received from the sender and stored in database 52). The resulting decrypted version of the encrypted message may be stored in database 52 (e.g., in a decrypted message database).

The server may provide the recipient with access to the decrypted message at step 142. Access may be provided using a web browser interface arrangement of the type shown in FIG. 8, a web-based mailbox interface of the type shown in FIG. 9, or using any other suitable access arrangement.

The secure messaging arrangement of FIGS. 12 and 13 makes it unnecessary for the recipient to forward messages to a server for decryption. If desired, a recipient in system 10 may install and run software on the recipient's equipment 12 that automatically forwards encrypted mail to a server 18 for decryption. Such an auto-forwarding approach may be acceptable to system administrators that are reluctant to grant extensive software installation privileges to users in their network. If an auto-forwarding arrangement is used, it is not necessary to provide recipients with forwarding notification information. It is also not necessary for the sender to directly send a copy of the encrypted message to the server, because a copy of the encrypted message is automatically provided to the server. The sender is able to send the copy of the encrypted message to the server through the use of the recipient's automatic forwarding software without the manual intervention of the recipient (e.g., without requiring the recipient to manually use an email program to forward the encrypted message to the server).

The foregoing is merely illustrative of the principles of this invention and various modifications can be made by those skilled in the art without departing from the scope and spirit of the invention.

What is claimed is:

1. A method for securely conveying a message over a communications network from a sender to a recipient, wherein the recipient has a message address and has a public key and a private key for use in encryption and decryption, comprising:

with the computing equipment at the sender, encrypting the message for the recipient using the public key of the recipient;

sending the encrypted message from the computing equipment at the sender to the message address of the recipient over the communications network;

adding forwarding notification information to the encrypted message in the form of instructions for the recipient that direct the recipient to forward the encrypted message for decryption, wherein the encrypted message with the added forwarding notification information is provided to the recipient;

at a server, receiving from the computing equipment at the sender the encrypted message addressed to the recipient;

providing the recipient with an interactive message access prompt formed from a universal resource locator to which the recipient can respond by clicking on the universal resource locator to begin obtaining access to a decrypted version of the message;

using the server to obtain credentials from the recipient when the recipient responds to the interactive message access prompt by clicking on the universal resource locator;

with a decryption engine on the server, using the recipient's credentials to obtain a copy of the recipient's private key;

with the decryption engine on the server, decrypting the encrypted message using the copy of the recipient's private key to produce the decrypted version of the message; and with the server, providing the recipient with access to the decrypted version of the message, wherein the recipient's public key is an IBE public key and the recipient's private key is an IBE private key, wherein the sender encrypts the message using the recipient's IBE public key, wherein decrypting the encrypted message comprises decrypting the encrypted message at the server using the IBE private key of the recipient to produce the decrypted version of the message.

2. The method defined in claim 1 wherein providing the recipient with access to the decrypted version of the message comprises providing the recipient with access to the decrypted version of the message over a secure communications link between the server and the recipient.

3. The method defined in claim 1 wherein using the server to obtain credentials from the recipient comprises using the server to obtain credentials from the recipient over a secure communications link.

4. The method defined in claim 1, wherein the recipient has a web browser, the method further comprising using the server to provide the recipient with access to the decrypted version of the message in the form of a web page provided to the recipient by the server over a secure communications link.

5. The method defined in claim 1 wherein using the server to obtain credentials from the recipient comprises obtaining a username and password from the recipient using the server.

6. The method defined in claim 1 wherein using the recipient's credentials to obtain a copy of the recipient's private key comprises using the server to present the recipient's public key to an IBE private key generator with a request for a copy of the recipient's IBE private key.

7. The method defined in claim 1 further comprising, at the server, storing the encrypted message in an encrypted message database.

8. The method defined in claim 1 further comprising, at the server, storing the decrypted message in a decrypted message database.

9. The method defined in claim 1 further comprising using the server to send the recipient a notification message that contains the encrypted message and that contains the forwarding notification information, wherein the forwarding notification information directs the recipient to forward the encrypted message to the server for decryption.

10. The method defined in claim 1 wherein adding the forwarding notification information comprises adding the forwarding notification information to the encrypted message at the sender.

11. The method defined in claim 1 wherein adding the forwarding notification information comprises adding the forwarding notification information to the encrypted message at the server.

12. The method defined in claim 1 wherein adding the forwarding notification information comprises adding the forwarding notification information to the encrypted message at an intermediate mail server that lies in a communications path between the sender and the recipient.

13. The method defined in claim 1 wherein providing the recipient with the interactive message access prompt comprises using the server to provide the recipient with an interactive message access prompt to which the recipient can respond to begin obtaining access to the decrypted version of the message.

14. The method defined in claim 1 wherein providing the recipient with the interactive message access prompt comprises using the server to send the recipient an interactive message containing the interactive message access prompt to which the recipient can respond to begin obtaining access to the decrypted version of the message.

15. The method defined in claim 1 further comprising storing the encrypted message received from the sender at the server, wherein providing the recipient with the interactive message access prompt comprises using the server to send the recipient an interactive message that informs the recipient that the encrypted message has been received and that contains the interactive message access prompt to which the recipient can respond to begin obtaining access to the decrypted version of the message.

16. The method defined in claim 1 wherein providing the recipient with the interactive message access prompt comprises using the server to send the recipient an interactive message when the server receives a forwarded encrypted message from the recipient, wherein the interactive message contains the interactive message access prompt to which the recipient can respond to begin obtaining access to the decrypted version of the message.

17. The method defined in claim 1 wherein providing the recipient with the interactive message access prompt comprises adding the interactive message access prompt to the encrypted message at the sender.

18. The method defined in claim 1 wherein providing the recipient with the interactive message access prompt comprises adding the interactive message access prompt to the encrypted message at the server.

19. The method defined in claim 1 wherein providing the recipient with the interactive message access prompt comprises adding the interactive message access prompt to the encrypted message at an intermediate mail server that lies in a communications path between the sender and the recipient.

20. The method defined in claim 1 further comprising at the sender, sending a copy of the encrypted message to a message address for the server.

21. The method defined in claim 20 further comprising using the server to provide the recipient with the interactive message access prompt when the server receives the copy of the encrypted message sent to the message address of the server by the sender.

22. The method defined in claim 1 wherein the server is within the same organization as the recipient, the method further comprising using the server to provide the recipient with access to the decrypted version of the message without installing a decryption engine at the recipient for decrypting the encrypted message.

* * * * *